(12) United States Patent
Tanahashi et al.

(10) Patent No.: US 6,293,246 B1
(45) Date of Patent: Sep. 25, 2001

(54) SPARK-ASSIST TYPE SELF-IGNITION ENGINE

(75) Inventors: Toshio Tanahashi; Toshimi Murai; Yushiro Yasuda, all of Susono; Toshiaki Asada, Mishima, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/239,400

(22) Filed: Jan. 28, 1999

(30) Foreign Application Priority Data

Jan. 30, 1998 (JP) .................................................. 10-019160

(51) Int. Cl.[7] .................................................. F02B 11/00
(52) U.S. Cl. .................... 123/305; 123/435; 123/406.41; 123/406.55; 123/568.21
(58) Field of Search .................... 123/406.41, 406.42, 123/406.55, 568.21, 295, 305, 435; 60/278, 279

(56) References Cited

U.S. PATENT DOCUMENTS

| 4,920,937 | * | 5/1990 | Sasaki et al. ........................ 123/305 |
| 5,904,127 | * | 5/1999 | Kemmler et al. .................... 123/295 |
| 5,941,213 | * | 8/1999 | Ishii et al. ............................. 123/305 |
| 6,006,720 | * | 12/1999 | Yanagahira et al. ................ 123/305 |
| 6,058,904 | * | 5/2000 | Kruse .................................. 123/295 |

FOREIGN PATENT DOCUMENTS 2141648U  11/1990  (JP) .

* cited by examiner

*Primary Examiner*—Erick Solis
(74) *Attorney, Agent, or Firm*—Kenyon & Kenyon

(57) ABSTRACT

An engine comprising a spark plug and a fuel injector in a combustion chamber and a temperature sensor used to judge if the gas temperature in the combustion chamber is a temperature at which self-ignition occurs when a spark is generated. Based on this judgement, a valve timing device is used to control the opening timing of the intake valve and maintain the gas temperature at a temperature at which self-ignition occurs when a spark is generated.

19 Claims, 21 Drawing Sheets

Fig.1
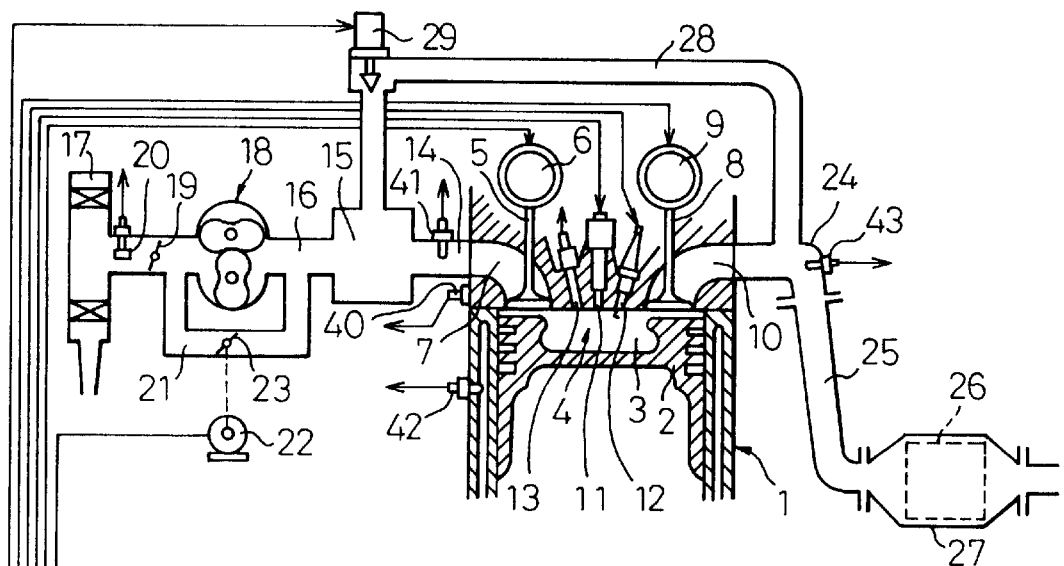
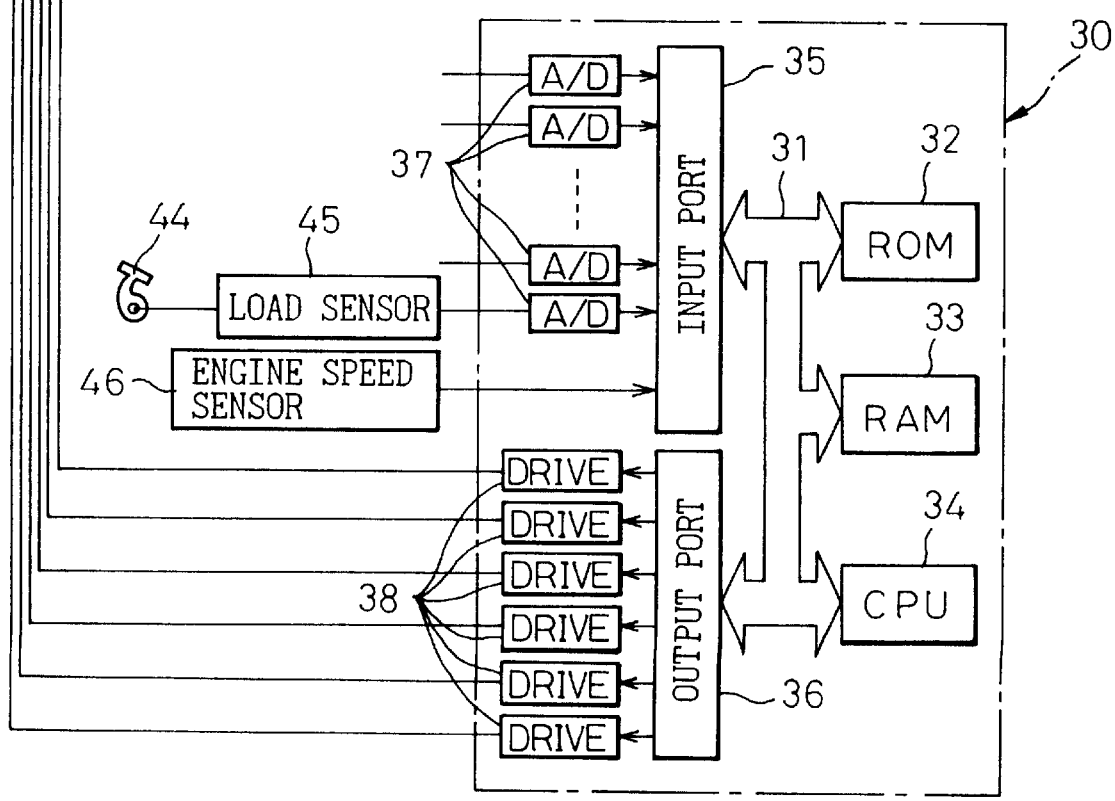

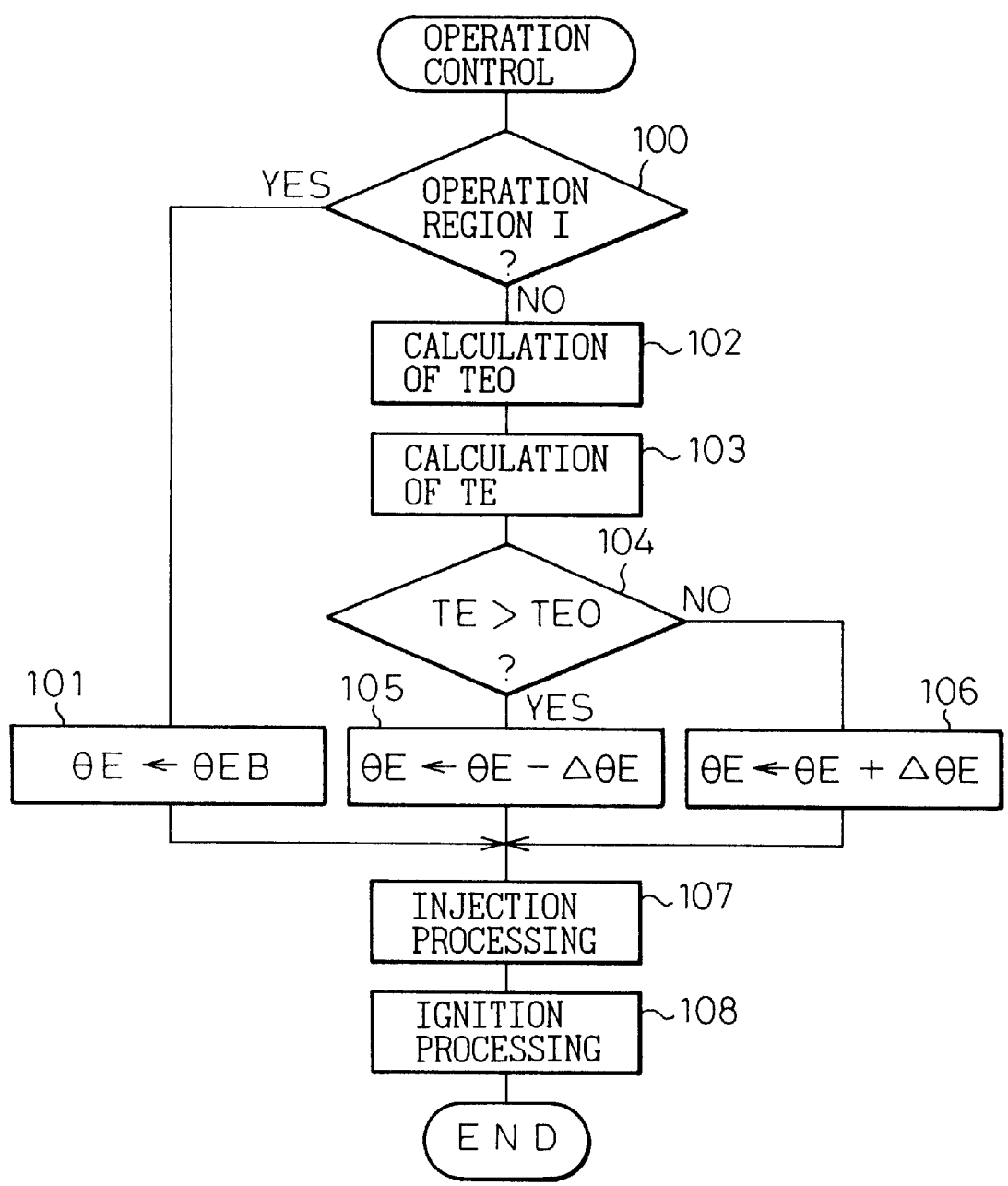

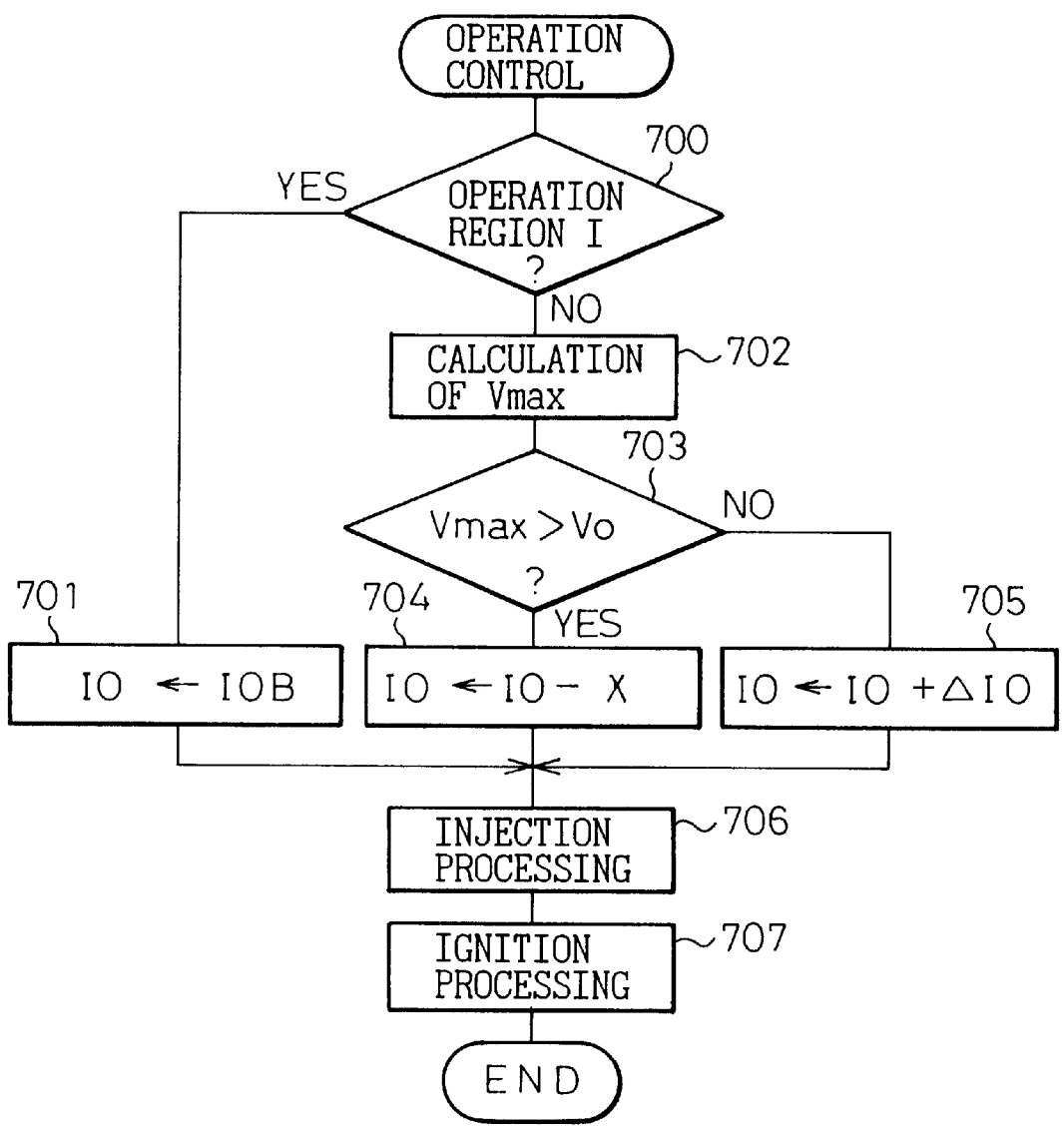

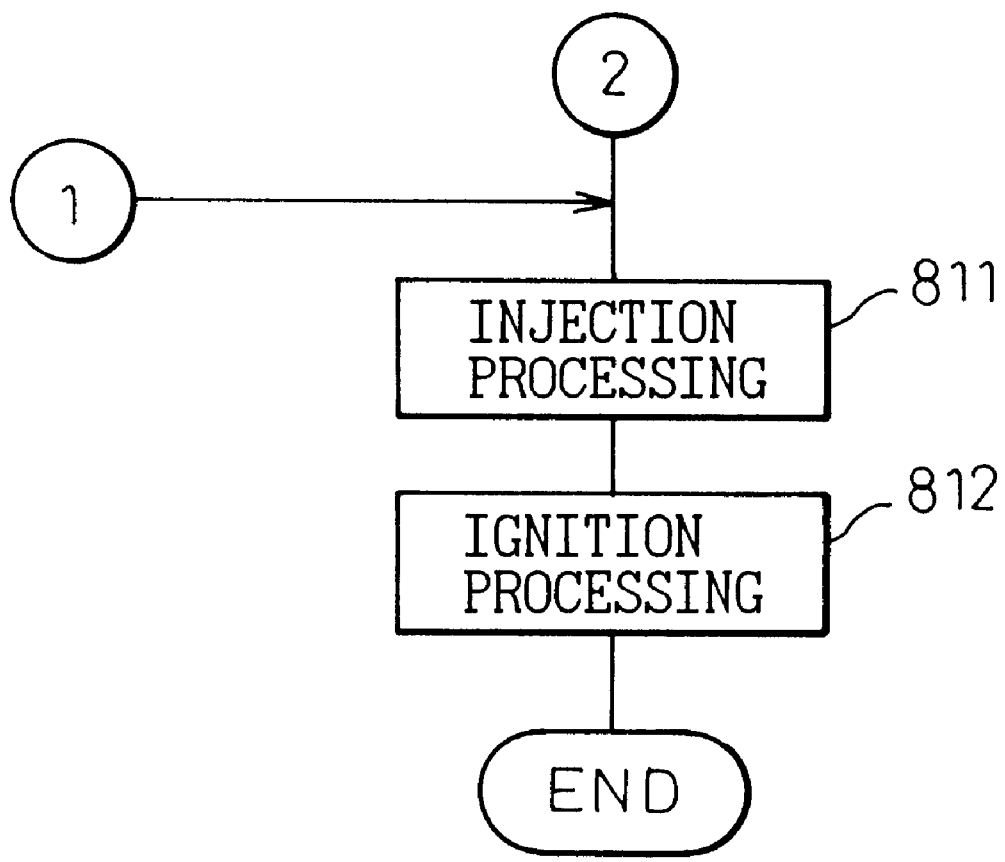

SPARK-ASSIST TYPE SELF-IGNITION ENGINE

BACKGROUND OF THE INVENTION

1. Field of the Invention

The present invention relates to a spark-assist type self-ignition engine.

2. Description of the Related Art

In the past, when injecting fuel in a diesel engine, part of the fuel immediately evaporates to form a preliminary air-fuel mixture. The remaining fuel is dispersed in the combustion chamber in the form of fuel droplets. Next, the preliminary air-fuel mixture is made to self-ignite. This serves as the heat source for successive combustion of the fuel evaporated from the fuel droplets. That is, diffusive combustion is performed. In this case, when the ratio of the preliminary air-fuel mixture becomes greater, explosive combustion occurs, so the combustion temperature rapidly rises and therefore a large amount of NOx is produced.

Therefore, known in the art is a diesel engine designed so that a combustion pressure sensor and spark plug are arranged in the combustion chamber, the ratio of the preliminary air-fuel mixture is found from the detected combustion pressure, when the ratio of the preliminary air-fuel mixture becomes greater than the optimum value, the spark timing is advanced to make the preliminary air-fuel mixture ignite by the spark plug before the amount of generation of the preliminary air-fuel mixture increases excessively, and when the ratio of the preliminary air-fuel mixture at the time of ignition by the spark plug becomes smaller than the optimum value, the spark timing is delayed to make the preliminary air-fuel mixture ignite by the spark plug when the amount of generation of the preliminary air-fuel mixture increases to a suitable amount (Japanese Unexamined Utility Model Publication (Kokai) No. 2-141648).

The light oil used in diesel engines has a large fuel component with a high molecular weight, so the majority of the fuel does not easily evaporate. When injected, only the part of the low boiling point component gradually evaporates. That is, after the start of the injection, the amount of the preliminary air-fuel mixture generated gradually increases along with the elapse of time. Therefore, in a diesel engine, as explained above, it has been considered to control the amount of preliminary air-fuel mixture able to be ignited by control of the spark timing.

Gasoline, methanol, and other low cetane value fuels inherently do not easily self-ignite, but even if these fuels are used, they will self-ignite if the gas temperature in the combustion chamber becomes high enough. This self-ignition, however, cannot be controlled unlike with a diesel engine. That is, gasoline and methanol have low molecular weights, therefore when injected immediately vaporize whereby the entire air-fuel mixture becomes a preliminary air-fuel mixture. Accordingly, when self-ignition occurs, the entire air-fuel mixture always self-ignites. That is, it is not possible to control the ratio of the preliminary air-fuel mixture causing self-ignition as in a diesel engine.

The self-ignition when using gasoline or methanol, however, occurs before the top dead center of the compression stroke, therefore when self-ignition occurs, knocking occurs. Therefore, in the related art, when using a fuel such as gasoline or methanol, effort is made to prevent self-ignition as much as possible and to make the air-fuel mixture burn by the flame of ignition of the spark plug.

Since the entire air-fuel mixture starts to burn simultaneously when self-ignition occurs, the temperature does not become higher locally. The combustion temperature in the combustion chamber becomes lower overall. As a result, the amount of generation of NOx becomes extremely small. Accordingly, if it were possible to control the timing of the self-ignition so that the self-ignition occurred after the top dead center of the compression stroke, gentle combustion with little generation of NOx could be achieved.

The timing of the self-ignition is controlled even in the above diesel engine, but in a diesel engine the timing of the self-ignition is controlled to control the preliminary air-fuel mixture. As opposed to this, in the present invention, the timing at which the entire air-fuel mixture self-ignites is controlled, so the above-mentioned diesel engine and the present invention inherently differ from each other.

SUMMARY OF THE INVENTION

An object of the present invention is to provide a spark-assist type self-ignition engine capable of obtaining gentle combustion with little generation of NOx through control of the self-ignition.

According to the present invention, there is provided a spark-assist type self-ignition engine comprising: a combustion chamber; a spark plug arranged in the combustion chamber; judging means for judging if a gas temperature in the combustion chamber at the end of a compression stroke is a target temperature or within a target temperature range at which self-ignition of an entire air-fuel mixture is caused when a spark is generated; and control means for controlling the gas temperature in the combustion chamber at the end of the compression stroke to the target temperature or to within the target temperature range based on the results of judgement of the judging means.

BRIEF DESCRIPTION OF THE DRAWINGS

The present invention may be more fully understood from the description of the preferred embodiments of the invention set forth below together with the accompanying drawings, in which:

FIG. 1 is an overall view of an internal combustion engine;

FIG. 7 is a flow chart of the control of the operation in a first embodiment;

FIG. 15 is a flow chart of the control of the operation in a seventh embodiment;

FIGS. 17 and 18 are flow charts of the control of the operation in an eighth embodiment;

DESCRIPTION OF THE PREFERRED EMBODIMENTS

Figure 2A:
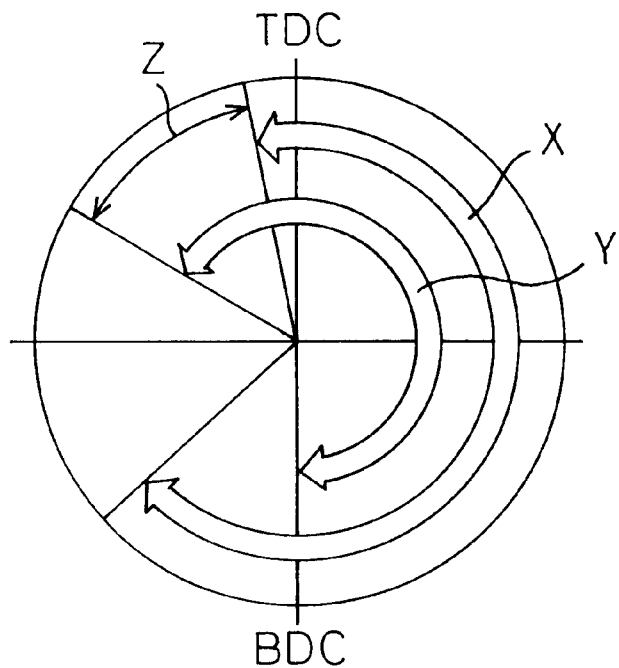
FIGS. 2A and 2B are views for explaining control of the opening timing of an intake valve and exhaust valve.

Referring to FIG. 1, 1 shows an engine body, 2 a piston, 3 a cavity formed in the top surface of the piston 2, 4 a combustion chamber, 5 an intake valve, 6 a valve timing control device for controlling the operational timing of the intake valve 5, 7 an intake port, 8 an exhaust valve, 9 a valve timing control device for controlling the operational timing of the exhaust valve 8, 10 an exhaust port, 11 a fuel injector for injecting fuel toward the inside of the cavity 3, 12 a spark plug, and 13 a combustion pressure sensor.

The intake port 7 is connected through a corresponding intake tube 11 to a surge tank 15. The surge tank 15 is connected through an intake duct 16 to an air cleaner 17. A mechanical supercharger 18 driven by the engine is arranged in the intake duct 16. A throttle valve 19 and mass flowmeter 20 are arranged in the intake duct 16 upstream of the mechanical supercharger 18. The intake duct 16 has connected to it a bypass passage 21 bypassing the mechanical supercharger 18. In the bypass passage 21 is arranged a bypass control valve 23 driven by an actuator 22.

On the other hand, the exhaust port 10 is connected to an exhaust manifold 24. The outlet of the exhaust manifold 24 is connected to a casing 27 housing a NOx absorbent 26. The exhaust manifold 24 is connected through an exhaust gas recirculation (EGR) passage 28 to the surge tank 15. An EGR control valve 29 is arranged in the EGR passage 28.

The electronic control unit 30 is comprised of a digital computer and is provided with a read only memory (ROM) 32, a random access memory (RAM) 33, a microprocessor (CPU) 34, an input port 35, and an output port 36 connected with each other by a bidirectional bus 31. The combustion pressure sensor 13 generates an output voltage proportional to the pressure in the combustion chamber 4. This output voltage is input through a corresponding AD converter 37 to the input port 35. The mass flowmeter 20 generates an output voltage proportional to the mass flow of the intake air. This output voltage is input through a corresponding AD converter 37 to the input port 35.

The engine block 1 has a knocking sensor 40 generating an output voltage proportional to the intensity of the knocking. The output voltage 40 of the knocking sensor 40 is input through a corresponding AD converter 37 to the input port 35. The intake tube 14 has mounted a temperature sensor 41 generating an output voltage proportional to the temperature of the mixed gas of the intake air and the EGR gas. The output voltage of the temperature sensor 41 is input through a corresponding AD converter 37 to the input port 35. The engine block 1 has mounted a water temperature sensor 42 generating an output voltage proportional to the temperature of the engine cooling water. The output voltage of the water temperature sensor 42 is input through a corresponding AD converter 37 to the input port 35. The exhaust manifold 24 has mounted an air-fuel ratio sensor 43 for detecting the air-fuel ratio. The output voltage of the air-fuel ratio sensor 43 is input through a corresponding AD converter 37 to the input port 35.

The accelerator pedal 44 has connected to it a load sensor 45 for generating an output voltage proportional to the amount of depression of the accelerator pedal 40. The output voltage of the load sensor 45 is input through a corresponding AD converter 37 to the input port 35. Further, the input port 35 receives as input an output signal of a rotational speed sensor 46 expressing the engine rotational speed. Further, the output port 36 has connected to it through corresponding drive circuits 38 the valve timing control devices 6 and 9, the fuel injector 11, the spark plug 12, the actuator 22, and the EGR control valve 29.

Figure 2B:
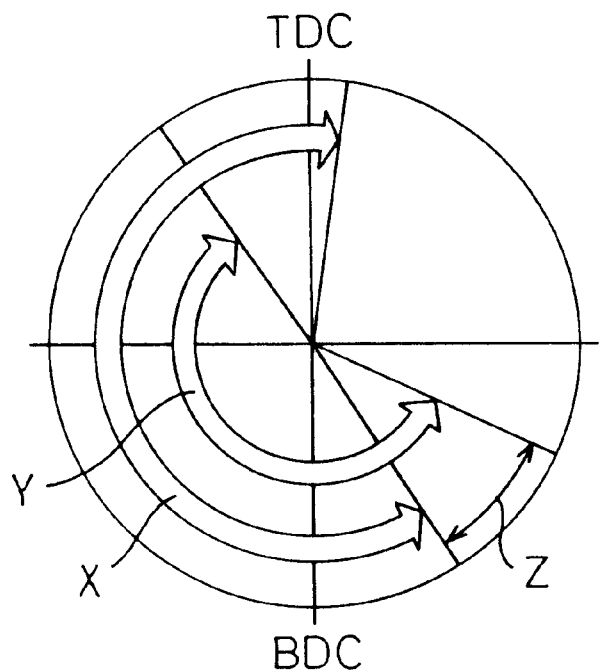

The intake valve 5 and the exhaust valve 8 are controlled by a camshaft (not shown) driven by the engine crankshaft. The phase of the camshaft of the intake valve with respect to the crankshaft is controlled by the valve timing control device 6, whereby the opening period of the intake valve 5, as shown in FIG. 2A, is controlled to any opening period between X and Y, that is, the opening period is controlled to any opening timing in the range of Z. Similarly, the phase of the camshaft of the exhaust valve 8 with respect to the crankshaft is controlled by the valve timing control device 9, whereby, as shown in FIG. 2B, the opening period of the exhaust valve 8 is controlled to any opening period between X and Y, that is, the opening period is controlled to any opening timing in the range of Z.

Figure 3:
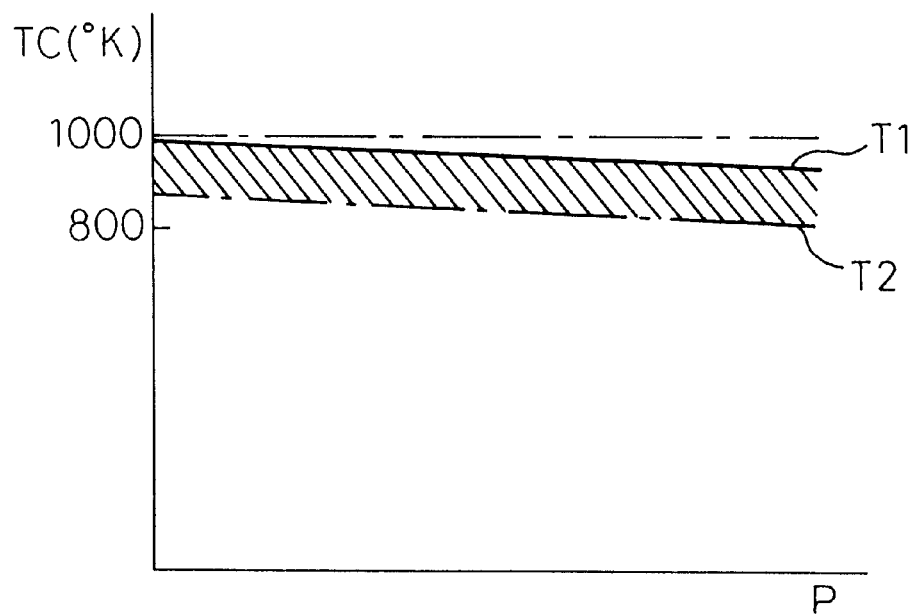
FIG. 3 is a view of the range of temperature in which self-ignition due to sparks occurs.

In the present invention, as the fuel, use is made of gasoline or methanol or another low cetane value fuel. It is learned that if such a fuel, for example, gasoline, is used, when the gas temperature in the combustion chamber 4 exceeds about 1000° K. under the compression ratio of a normal gasoline engine, the fuel will self-ignite. The solid line T1 in FIG. 3 shows the lower limit temperature where the fuel will self-ignite. Note that in FIG. 3, the ordinate TC ordinate shows the gas temperature (° K) in the combustion chamber 4, while the abscissa P shows the pressure in the combustion chamber 4. When the pressure in the combustion chamber 4 becomes higher, the density of the oxygen becomes higher, so self-ignition occurs more easily. Therefore, as shown in FIG. 3, the lower limit temperature T1 where self-ignition occurs becomes lower the higher the pressure P in the combustion chamber 4.

When the gas temperature TC in the combustion chamber 4 exceeds the lower limit temperature T1 shown in FIG. 3, the fuel self-ignites. This self-ignition occurs in the process of the pressure in the combustion chamber 4 rising, that is, before the top dead center of the compression stroke. If self-ignition occurs before the top dead center of the compression stroke, knocking occurs, therefore it is necessary to avoid the occurrence of self-ignition before top dead center of the compression stroke. Therefore, in an internal combustion engine of the related art, the compression ratio etc. were set so that the temperature in the combustion chamber 4 before top dead center of the compression stroke will only rise to a temperature considerably lower than the lower limit temperature T1, that is, a temperature lower than the temperature T2 shown by the dash and dot line in FIG. 3. The entire air-fuel mixture was made to burn by the flame propagation of the air-fuel mixture ignited by the spark plug.

There are however several problems when making an air-fuel mixture burn by propagation of the ignition flame.

For example, when an air-fuel mixture is ignited, the pressure around the spark plug rises and as a result the air-fuel mixture at the peripheral portion of the combustion chamber away from the spark plug is compressed and self-ignites before top dead center of the compression stroke, whereby knocking sometimes occurs. Further, when using a lean air-fuel mixture, the flame is not sufficiently propagated and as a result good combustion is sometimes not obtained.

On the other hand, when the gas temperature in the combustion chamber 4 is somewhat lower than the lower limit temperature T1, for example, when the gas temperature in the combustion chamber 4 is in the region indicated by hatching in FIG. 3, self-ignition will not occur. At this time, however, when the air-fuel mixture is ignited by the spark plug 12, the air-fuel mixture around the spark plug 12 burns, therefore the pressure P in the combustion chamber 4 rises. If the pressure P in the combustion chamber 4 rises, the gas temperature in the combustion chamber 4 rises. Further, when the pressure P in the combustion chamber 4 rises, the lower limit temperature T1 becomes lower. Therefore, the temperature of the entire gas in the combustion chamber 4 exceeds the lower limit temperature T1 and therefore the entire air-fuel mixture in the combustion chamber 4 simultaneously self-ignites.

Accordingly, at this time, if the spark timing is suitably set, it is possible to make the main combustion occur due to self-ignition after the top dead center of the compression stroke. If the entire air-fuel mixture simultaneously self-ignites, the combustion temperature becomes lower over the entire combustion chamber 4, therefore the generation of NOx is suppressed. If main combustion occurs due to self-ignition after the top dead center of the compression stroke, the result is gentle combustion without knocking.

T2 shown by the dash and dot line in FIG. 3 shows the lower limit temperature at which self-ignition can be caused by a spark from the spark plug 12. Therefore, if the gas temperature in the combustion chamber 4 at the time of spark generation is within the range of temperature between T1 and T2 of FIG. 3, spark-assisted self-ignition combustion becomes possible. Note that if ignited as shown in FIG. 3, the range of temperature of self-ignition becomes at least about 800° K. and below substantially 1000° K.

There are various methods for raising the temperature of gas in the combustion chamber 4 at the time of spark generation from 800° K. to 1000° K. For example, one method is to increase the compression ratio to about 20. Another method is to recirculate the high temperature EGR gas in the combustion chamber 4 or leave a large amount of burned gas in the combustion chamber 4. Therefore, in one embodiment of the present invention, the compression ratio is increased to about 20. Further, in another embodiment of the present invention, the amount and temperature of the EGR gas supplied to the combustion chamber 4 are controlled.

Even if the compression ratio is increased to about 20 in this way however or even if the amount and temperature of the EGR gas are controlled, there is an operation region where good self-ignition combustion cannot be achieved. This will be explained next with reference to FIG. 4. Note that in FIG. 4, the ordinate Q/N shows the engine load (intake air amount Q/engine rotational speed N), while the abscissa N shows the engine rotational speed.

That is, when the engine is idling and in the operating state where the engine load Q/N is extremely low, the amount of heat generated is low, therefore it is difficult to make the temperature of gas TC in the combustion chamber 4 at the end of the compression stroke from 800° C. to 1000° K. Accordingly, when the engine is idling and in the state where the engine load Q/N is extremely low, that is, in the operation region I in FIG. 4, the conventionally performed normal combustion is performed.

Figure 4:
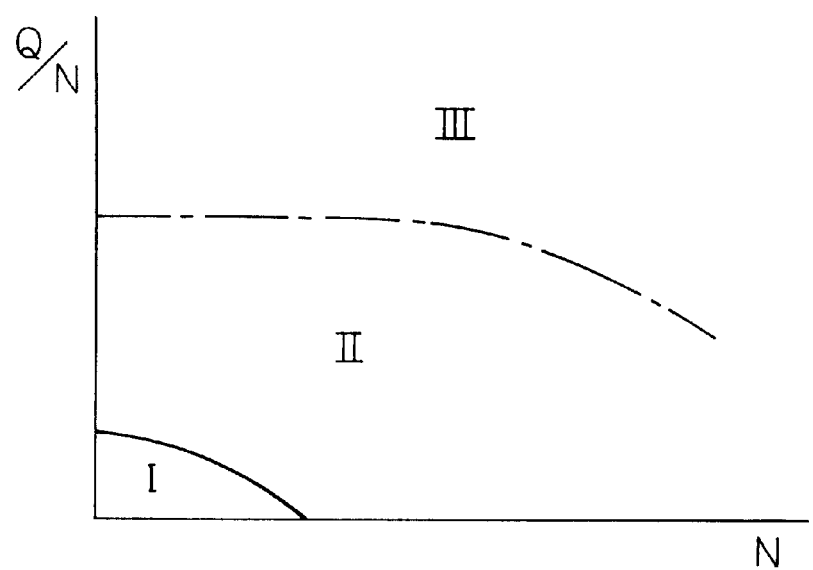
FIG. 4 is a view of the operation region.

On the other hand, during medium load operation, that is, in the operation region II in FIG. 4, the gas temperature in the combustion chamber 4 at the time of spark generation at the end of the compression stroke can be controlled to a range from 800° K. to 1000° K. Therefore, spark-assisted self-ignition combustion is performed in the operation region II.

On the other hand, during high load operation, that is, in the region III in FIG. 4, there are cases where spark-assisted self-ignition combustion is possible and cases where it is not possible. That is, when the compression ratio is made about 20, the gas temperature in the combustion chamber 4 ends up exceeding the lower limit temperature T1 shown in FIG. 3 and self-ignition not due to a spark ends up occurring before top dead center of the compression stroke. Therefore, in this case, the high load operation region III cannot be used. Accordingly, an internal combustion engine designed not to cause spark-assisted self-ignition combustion by making the compression ratio about 20 is suited for an internal combustion engine not using the high load operation region III.

On the other hand, when the compression ratio is relatively low and the heating action of the EGR gas etc. is used to cause spark-assisted self-ignition, there are cases where spark-assisted self-ignition combustion is possible in the high load operation region III and cases where it is not possible. That is, when the engine load becomes higher, the engine temperature becomes higher, but the amount of the intake air increases, so the amount of EGR gas has to be reduced. Therefore, the heating action by EGR gas etc. cannot be expected, therefore it is difficult to raise the gas temperature TC in the combustion chamber 4 at the end of the compression stroke to a range from 800° K. to 1000° K. in some cases.

When it is difficult to raise the gas temperature in the combustion chamber 4 to a range from 800° K. to 1000° K. in the high load operation region III in this way, the conventionally performed normal combustion is performed in the high load operation region III. On the other hand, when the compression ratio is raised to an extent where the gas temperature in the combustion chamber 4 does not exceed the lower limit temperature T1 in the high load operation region III, it is possible to control the gas temperature TC in the combustion chamber 4 at the time of spark generation at the end of the compression stroke to a range from 800° K. to 1000° K. even in the high load operation region III and therefore spark-assisted self-ignition combustion becomes possible. In this case, spark-assisted self-ignition combustion occurs in the high load operation region III.

Note that during spark-assisted self-ignition combustion in the medium load operation region II or high load operation region III, spark-assisted self-ignition combustion is performed by just part of the injected fuel. The remaining fuel may be injected into the self-ignition combustion gas after the start of the self-ignition combustion. If fuel is injected into the self-ignition combustion gas in this way, the successively injected fuel will be successively burned, therefore gentle combustion not accompanied with a sharp rise in pressure is performed. As a result, the amount of generation of NOx can be further reduced.

Figure 5:
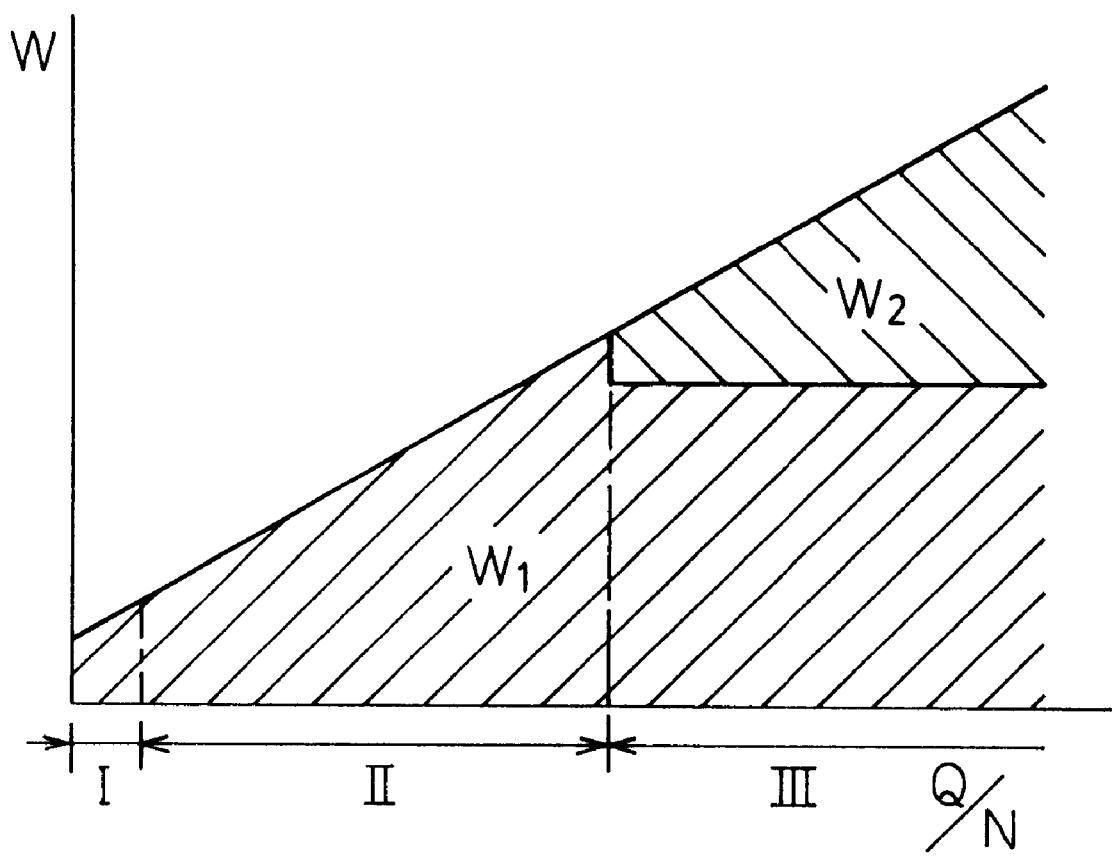
FIG. 5 is a view of the amount of injection.

FIG. 5 shows an example of injection of fuel into the self-ignition combustion gas in the high load operation region III. Note that in FIG. 5, the ordinate W shows the amount of fuel injected, while the abscissa Q/N shows the engine load. Further, I, II, and III on the abscissa respectively show the operation regions I, II, and III shown in FIG. 4. In FIG. 5, $W_1$ shows the amount of fuel injected before a spark is generated. At this time, in the low load operation region I, the conventionally performed normal combustion is performed, while in the medium load operation region II and the high load operation region III, the spark-assisted self-ignition combustion is performed. On the other hand, in FIG. 5, $W_2$ shows the amount of fuel injected into the spark-assisted self-ignition combustion gas. In this example, the amount of fuel injection $W_2$ is increased as the engine load Q/N becomes higher.

Further, the spark-assisted self-ignition combustion can be performed when the air-fuel ratio in the combustion chamber 4 is lean, is the stoichiometric air-fuel ratio, and is rich. Therefore, even if the internal combustion engine is designed to selectively switch the air-fuel ratio among lean, the stoichiometric air-fuel ratio, and rich according to the operating state of the engine, spark-assisted self-ignition combustion can be performed at every operating state.

Several examples where it is desirable to control the gas temperature in the combustion chamber 4 at the time of spark generation at the end of the compression stroke to between the lower limit temperatures T1 and T2 shown by the hatching in FIG. 3 so as to cause spark-assisted self-ignition combustion will be successively explained. To control the gas temperature in the combustion chamber 4 at the time of spark generation at the end of the compression stroke between the lower limit temperatures T1 and T2 shown by the hatching in FIG. 3, first a judging means is necessary for judging if the gas temperature in the combustion chamber 4 at the time of spark generation at the end of the compression stroke is between the lower limit temperatures T1 and T2 shown by the hatching in FIG. 3. Further, a control means is necessary for controlling the gas temperature in the combustion chamber 4 at the time of spark generation at the end of the compression stroke between the lower limit temperatures T1 and T2 shown by the hatching in FIG. 3 based on the results of judgement of the judging means.

In the first embodiment, it is judged if the gas temperature in the combustion chamber 4 at the time of spark generation at the end of the compression stroke is between the lower limit temperatures T1 and T2 shown by the hatching in FIG. 3 based on the gas temperature in the combustion chamber 4 at the start of compression and the amount of EGR gas recirculated in the combustion chamber 4 is controlled to control the gas temperature in the combustion chamber 4 at the time of spark generation at the end of the compression stroke to between the lower limit temperatures T1 and T2 shown by the hatching in FIG. 3.

Figure 6A:
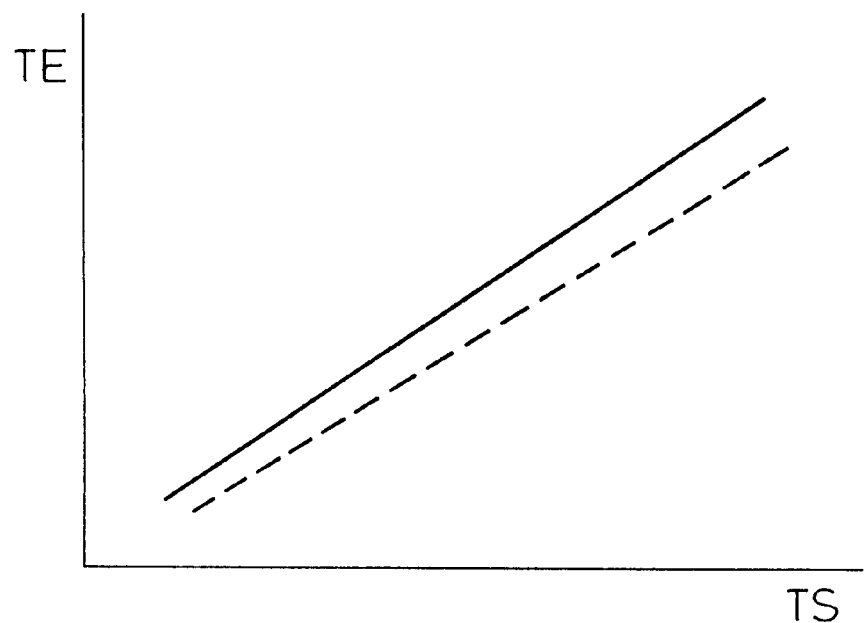
FIGS. 6A and 6B are views of the gas temperature in the combustion temperature at the time of spark generation.

That is, the gas temperature TE in the combustion chamber 4 at the optimum spark timing determined by the operating state of the engine is proportional to the gas temperature TS in the combustion chamber 4 at the start of combustion as shown by the solid line in FIG. 6A. The gas temperature TS in the combustion chamber 4 at the start of compression is substantially equal to the temperature of the mixed gas of the intake air flowing inside the intake port 7 and the EGR gas. Therefore, in the first embodiment, the temperature detected by the temperature sensor 41 in the intake tube 14 is made the gas temperature TS in the combustion chamber 4 at the start of compression, and the gas temperature TE in the combustion chamber 4 at the time of spark generation is found from the relationship shown by the solid line in FIG. 6A. Of course, at this time, the gas temperature in the combustion chamber 4 at the time of spark generation becomes a function of the spark timing. If the spark timing is advanced, the relationship between TE and TS becomes the relationship shown by the broken line in FIG. 6A.

Figure 6B:
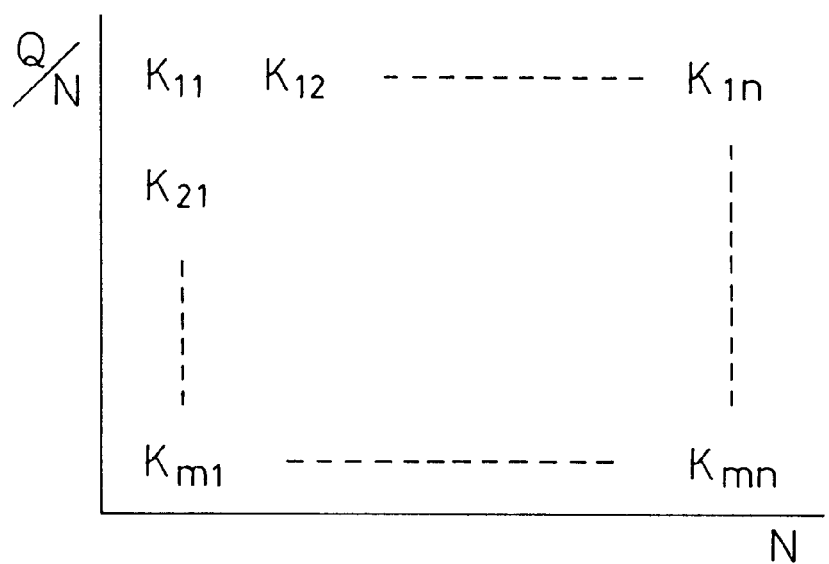

On the other hand, the gas temperature TE in the combustion chamber 4 at the time of spark generation becomes higher the higher the temperature of the surface of the inside wall of the cylinder. The temperature of the surface of the inside wall of the cylinder becomes a function of the engine load Q/N and engine rotational speed N. TE shown in FIG. 6A shows the gas temperature in the combustion chamber 4 at the time of spark generation when the temperature of the surface of the inside wall of the cylinder is the reference temperature, therefore the final TE is calculated by multiplying a correction coefficient K based on the temperature of the surface of the inside wall of the cylinder with TE. The correction coefficient K is stored in advance in the ROM 32 in the form of a map as a function of the engine load Q/N and the engine rotational speed N as shown in FIG. 6B.

Further, in the first embodiment, the amount of the EGR gas recirculated in the combustion chamber 4 is controlled by the EGR control valve 29. Note that in this case, instead of the amount of the EGR gas or in addition to the amount of the EGR gas, it is possible to control the temperature of EGR gas.

FIG. 7 shows the routine for the control of the operation for working a first embodiment.

Referring to FIG. 7, first, at step 100, it is judged if the engine is operating in the operation region I shown in FIG. 4 or not. When in the operation region I, the routine proceeds to step 101, where the degree of opening θE of the EGR control valve 29 is made a target degree of opening θEB determined in advance based on the operating state of the engine. Next, at step 107, processing is performed for fuel injection, then at step 108, processing is performed for spark generation at the optimum spark timing. At this time, the conventionally performed normal combustion is performed.

On the other hand, when it is judged at step 100 that the engine is operating in the medium load operation region II or high load operation region III shown in FIG. 4, the routine proceeds to step 102, where the intermediate value of the lower limit temperatures T1 and T2 shown in FIG. 3 is made the target temperature TEO. Next, at step 103, the TE calculated based on FIG. 6A from the output signal of the temperature sensor 41 is multiplied with the correction coefficient K shown in FIG. 6B to calculate the final TE. Next, at step 104, it is judged if TE is larger than TEO or not. When TE>TEO, the routine proceeds to step 105, where the degree of opening θE of the EGR control valve 29 is reduced by ΔθE and therefore TE is reduced. On the other hand, when TE≦TEO, the routine proceeds to step 106, where the degree of opening θE of the EGR control valve 29 is increased by ΔθE and therefore TE is raised. In this way, the gas temperature TE in the combustion chamber 4 at the time of spark generation is made the target temperature, therefore at this time spark-assisted self-ignition combustion is performed.

Note that when the conventionally performed normal combustion is performed in the high load operation region III, it is sufficient to proceed to step 101 when the engine is operating in the operation region I or III at step 100.

Next, an explanation will be given of a second embodiment. In the second embodiment, the degree of opening of the intake valve 5 is controlled by the valve timing control device 6 to control the gas temperature TE in the combustion chamber 4 at the time of spark generation to between the lower limit temperatures T1 and T2 shown by the hatching in FIG. 3.

That is, if the opening timing of the intake valve 5 is advanced, the amount of burned gas which is blown back from the combustion chamber 4 to the intake port 7 when the intake valve 5 opens increases. Next, the burned gas again flows into the combustion chamber 4. The temperature of this burned gas is considerably high, therefore if the amount of the burned gas which is blown back into the intake port 7 increases, the gas temperature TS in the combustion chamber 4 at the start of compression rises and as a result the gas temperature TE in the combustion chamber 4 at the time of spark generation becomes high. That is, the gas temperature TE in the combustion chamber 4 at the time of spark generation becomes higher the more advanced the opening timing of the intake valve 5. In this case, in the embodiment according to the present invention, the opening timing of the intake valve 5 can be advanced to about 60 degrees before top dead center of the suction stroke as shown in FIG. 2A.

Figure 8:
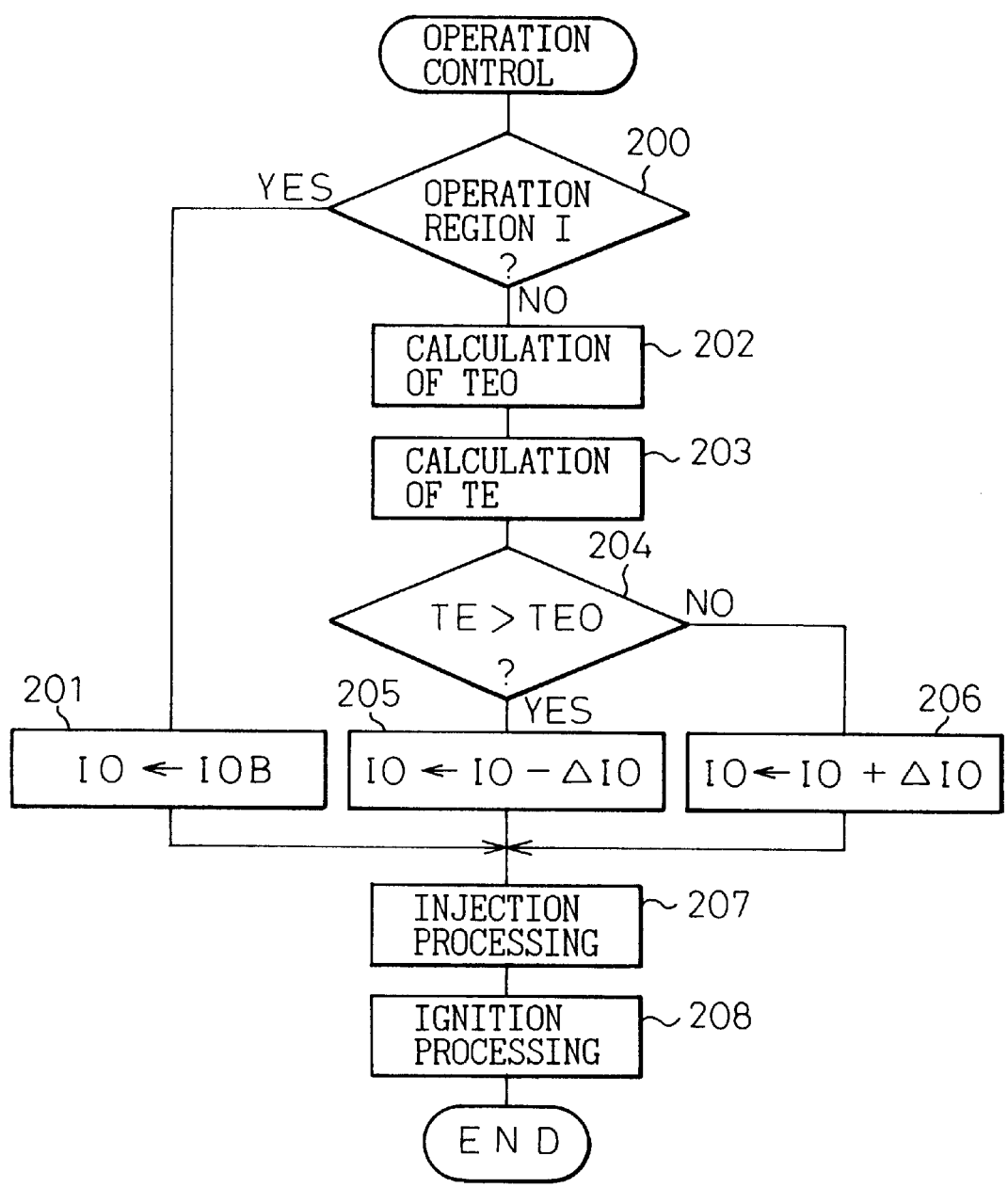
FIG. 8 is a flow chart of the control of the operation in a second embodiment.

FIGS. 8 shows the routine for the control of the operation for working a second embodiment.

Referring to FIG. 8, first, at step 200, it is judged if the engine is operating in the operation region I shown in FIG. 4 or not. When in the operation region I, the routine proceeds to step 201, where the opening timing IO of the intake valve 5 is made an opening timing IOB determined in advance based on the operating state of the engine. Next, at step 207, processing is performed for fuel injection, then at step 208, processing is performed for spark generation at the optimum spark timing. At this time, the conventionally performed normal combustion is performed.

On the other hand, when it is judged at step 200 that the engine is operating in the medium load operation region II or high load operation region III shown in FIG. 4, the routine proceeds to step 202, where the intermediate value of the lower limit temperatures T1 and T2 shown in FIG. 3 is made the target temperature TEO. Next, at step 203, the TE calculated based on FIG. 6A from the output signal of the temperature sensor 41 is multiplied with the correction coefficient K shown in FIG. 6B to calculate the final TE. Next, at step 204, it is judged if TE is larger than TEO or not. When TE>TEO, the routine proceeds to step 205, where the opening timing IO of the intake valve 5 is retarded by $\Delta$IO and therefore TE is reduced. On the other hand, when TE$\leq$TEO, the routine proceeds to step 206, where the opening timing IO of the intake valve 5 is advanced by $\Delta$IO and therefore TE is raised. In this way, the gas temperature TE in the combustion chamber 4 at the time of spark generation is made the target temperature, therefore at this time spark-assisted self-ignition combustion is performed.

Note that when the conventionally performed normal combustion is performed in the high load operation region III, it is sufficient to proceed to step 201 when the engine is operating in the operation region I or III at step 200.

Next, an explanation will be given of a third embodiment. In the third embodiment, the compression ratio of the engine is controlled to control the gas temperature TE in the combustion chamber 4 at the time of spark generation to between the lower limit temperatures T1 and T2 shown by the hatching in FIG. 3. That is, if the compression ratio of the engine is raised, the gas temperature TE in the combustion chamber 4 at the time of spark generation becomes high, so it is possible to control the compression ratio of the engine to control the gas temperature TE in the combustion chamber 4 at the time of spark generation.

Various mechanisms are known for control of the compression ratio of an engine. Therefore, the explanation of the mechanism for control of the compression ratio of the engine will be omitted.

Figure 9:
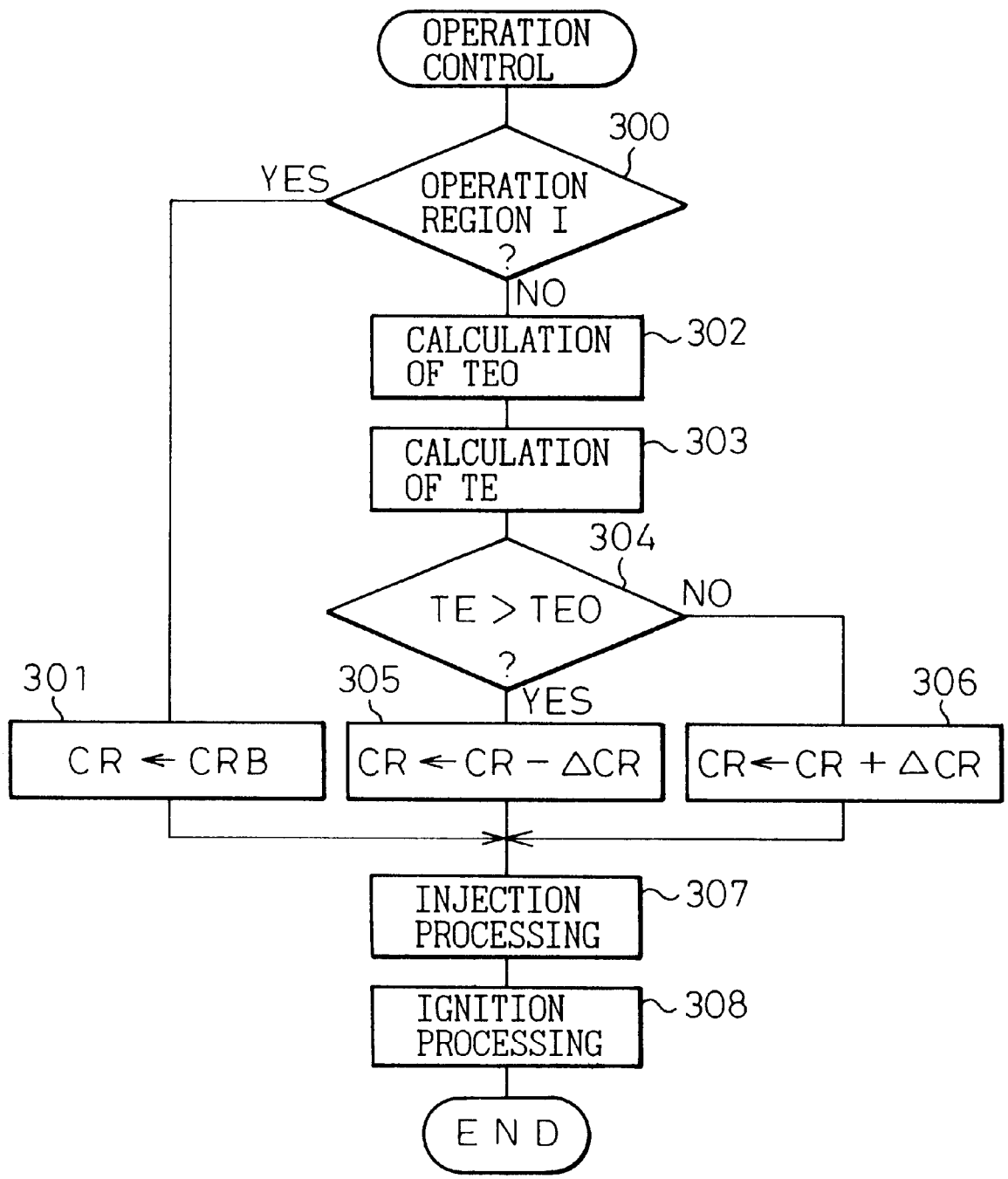
FIG. 9 is a flow chart of the control of the operation in a third embodiment.

FIG. 9 shows the routine for the control of the operation for working a third embodiment.

Referring to FIG. 9, first, at step 300, it is judged if the engine is operating in the operation region I shown in FIG. 4 or not. When in the operation region I, the routine proceeds to step 301, where the compression ratio CR of the engine is made a compression ratio CRB determined in advance based on the operating state of the engine. Next, at step 307, processing is performed for fuel injection, then at step 308, processing is performed for spark generation at the optimum spark timing. At this time, the conventionally performed normal combustion is performed.

On the other hand, when it is judged at step 300 that the engine is operating in the medium load operation region II or high load operation region III shown in FIG. 4, the routine proceeds to step 302, where the intermediate value of the lower limit temperatures T1 and T2 shown in FIG. 3 is made the target temperature TEO. Next, at step 303,the TE calculated based on FIG. 6A from the output signal of the temperature sensor 41 is multiplied with the correction coefficient K shown in FIG. 6B to calculate the final TE. Next, at step 304, it is judged if TE is larger than TEO or not. When TE>TEO, the routine proceeds to step 305, where the compression ratio CR is reduced by $\Delta$CR and therefore TE is reduced. On the other hand, when TE $\leq$TEO, the routine proceeds to step 306, the compression ratio CR is increased by $\Delta$CR and therefore TE is raised. In this way, the gas temperature TE in the combustion chamber 4 at the time of spark generation is made the target temperature, therefore at this time spark-assisted self-ignition combustion is performed.

Note that when the conventionally performed normal combustion is performed in the high load operation region III, it is sufficient to proceed to step 301 when the engine is operating in the operation region I or III at step 300.

Next, an explanation will be given of a fourth embodiment. In the fourth embodiment, the supercharging pressure of the intake air is controlled to control the gas temperature TC in the combustion chamber 4 at the time of spark generation to between the lower limit temperatures T1 and T2 shown by hatching in FIG. 3.

That is, if the supercharging pressure becomes higher, the gas temperature TE in the combustion chamber 4 at the time of spark generation becomes high, therefore it is possible to control the supercharging pressure to control the gas temperature TE in the combustion chamber 4 at the time of spark generation. In this embodiment, the supercharging pressure is controlled by controlling the degree of opening of the bypass control valve 23. In this case, the supercharging pressure becomes higher the smaller the degree of opening of the bypass control valve 23.

Figure 10:
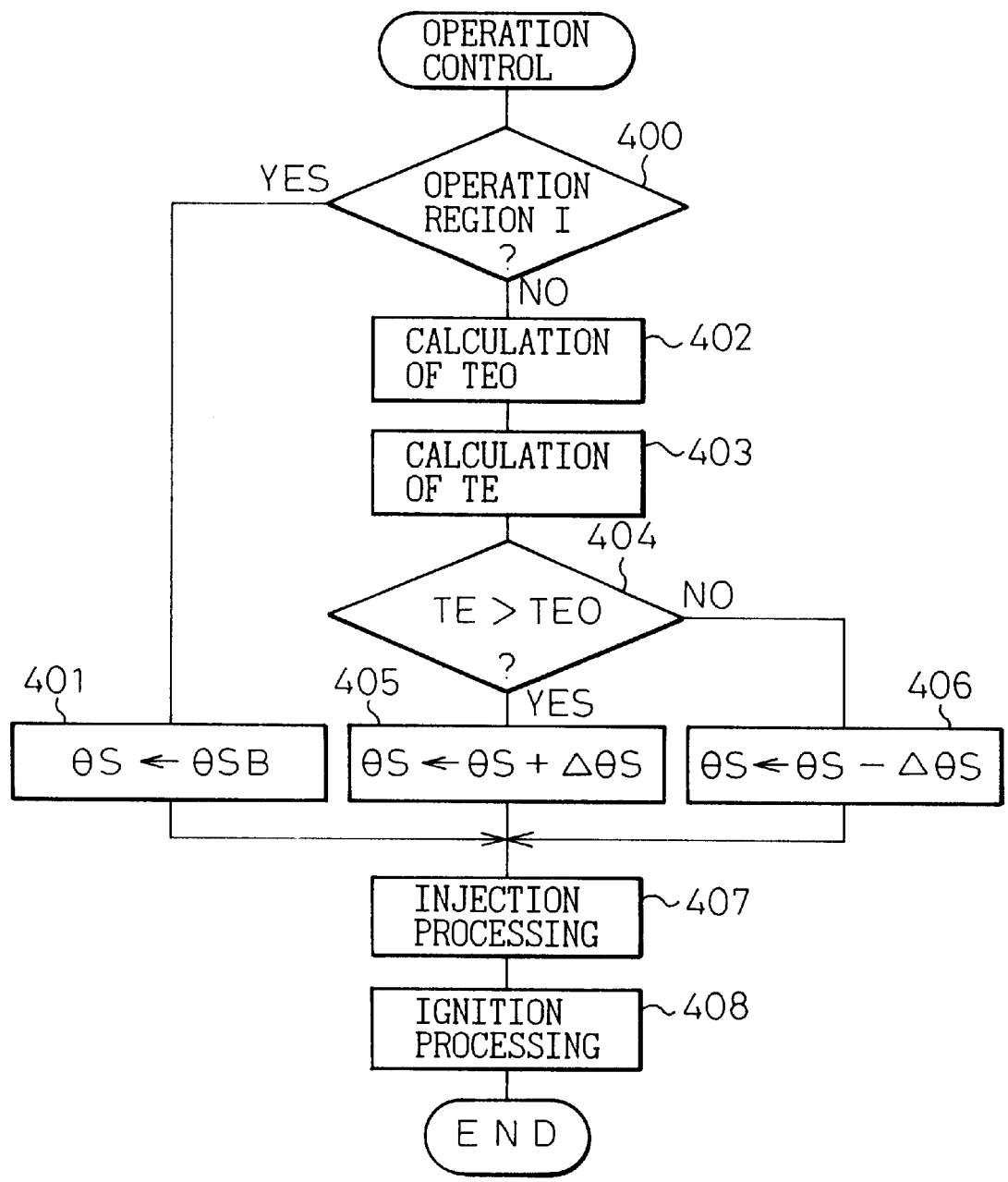
FIG. 10 is a flow chart of the control of the operation in a fourth embodiment.

FIG. 10 shows the routine for the control of the operation for working a fourth embodiment.

Referring to FIG. 10, first, at step 400, it is judged if the engine is operating in the operation region I shown in FIG. 4 or not. When in the operation region I, the routine proceeds to step 401, where the degree of opening $\theta$S of the bypass control valve 23 is made a target degree of opening OSB determined in advance based on the operating state of the engine. Next, at step 407, processing is performed for fuel injection, then at step 408, processing is performed for spark generation at the optimum spark timing. At this time, the conventionally performed normal combustion is performed.

On the other hand, when it is judged at step 400 that the engine is operating in the medium load operation region II or high load operation region III shown in FIG. 4, the routine proceeds to step 402, where the intermediate value of the lower limit temperatures T1 and T2 shown in FIG. 3 is made the target temperature TEO. Next, at step 403, the TE calculated based on FIG. 6A from the output signal of the temperature sensor 41 is multiplied with the correction coefficient K shown in FIG. 6B to calculate the final TE. Next, at step 404, it is judged if TE is larger than TEO or not. When TE >TEO, the routine proceeds to step 405, where the degree of opening θS of the bypass control valve 23 is increased by ΔθS and therefore TE is reduced. On the other hand, when TE≦TEO, the routine proceeds to step 406, where the degree of opening θS of the bypass control valve 23 is decreased by ΔθS and therefore TE is raised. In this way, the gas temperature TE in the combustion chamber 4 at the time of spark generation is made the target temperature, therefore at this time spark-assisted self-ignition combustion is performed.

Note that when the conventionally performed normal combustion is performed in the high load operation region III, it is sufficient to proceed to step 401 when the engine is operating in the operation region I or III at step 400.

Next, an explanation will be given of a fifth embodiment. In the fifth embodiment, the degree of opening of the exhaust valve 8 is controlled by the valve timing control device 9 to control the gas temperature TE in the combustion chamber 4 at the time of spark generation to between the lower limit temperatures T1 and T2 shown by the hatching in FIG. 3.

That is, if the opening timing of the exhaust valve 8 is advanced, the temperature of the exhaust gas becomes high, therefore the temperature of the EGR gas recirculated in the combustion chamber 4 becomes high. Therefore, it is possible to control the opening timing of the exhaust valve 8 to control the gas temperature TE in the combustion chamber 4 at the time of spark generation.

Figure 11:
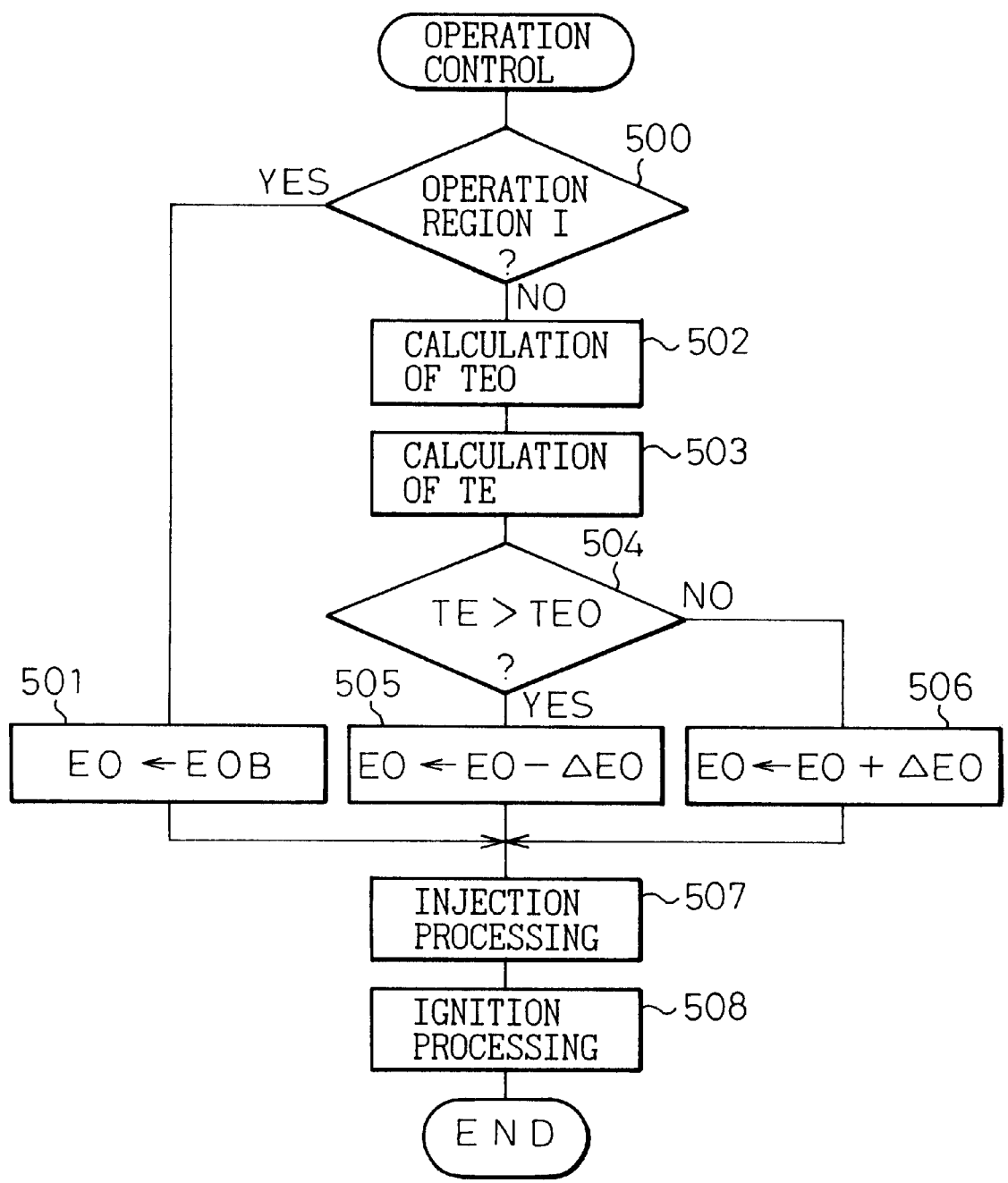
FIG. 11 is a flow chart of the control of the operation in a fifth embodiment.

FIG. 11 shows the routine for the control of the operation for working a fifth embodiment.

Referring to FIG. 11, first, at step 500, it is judged if the engine is operating in the operation region I shown in FIG. 4 or not. When in the operation region I, the routine proceeds to step 501, where the opening timing EO of the exhaust valve 5 is made a target opening timing EOB determined in advance based on the operating state of the engine. Next, at step 507, processing is performed for fuel injection, then at step 508, processing is performed for spark generation at the optimum spark timing. At this time, the conventionally performed normal combustion is performed.

On the other hand, when it is judged at step 500 that the engine is operating in the medium load operation region II or high load operation region III shown in FIG. 4, the routine proceeds to step 502, where the intermediate value of the lower limit temperatures T1 and T2 shown in FIG. 3 is made the target temperature TEO. Next, at step 503, the TE calculated based on FIG. 6A from the output signal of the temperature sensor 41 is multiplied with the correction coefficient K shown in FIG. 6B to calculate the final TE. Next, at step 504, it is judged if TE is larger than TEO or not. When TE >TEO the routine proceeds to step 505, where the opening timing EO of the exhaust valve 5 is retarded by ΔEO and therefore TE is reduced. On the other hand, when TE ≦TEO, the routine proceeds to step 506, where the opening timing EO of the exhaust valve 5 is by advanced by ΔEO and therefore TE is raised. In this way, the gas temperature TE in the combustion chamber 4 at the time of spark generation is made the target temperature, therefore at this time spark-assisted self-ignition combustion is performed.

Note that when the conventionally performed normal combustion is performed in the high load operation region III, it is sufficient to proceed to step 501 when the engine is operating in the operation region I or III at step 500.

Next, an explanation will be given of a sixth embodiment. In the sixth embodiment, it is judged if the gas temperature TE in the combustion chamber 4 at the time of spark generation is between the lower limit temperatures T1 and T2 shown by the hatching in FIG. 3 based on the change in pressure P in the combustion chamber detected by the combustion pressure sensor 13.

Figure 12:
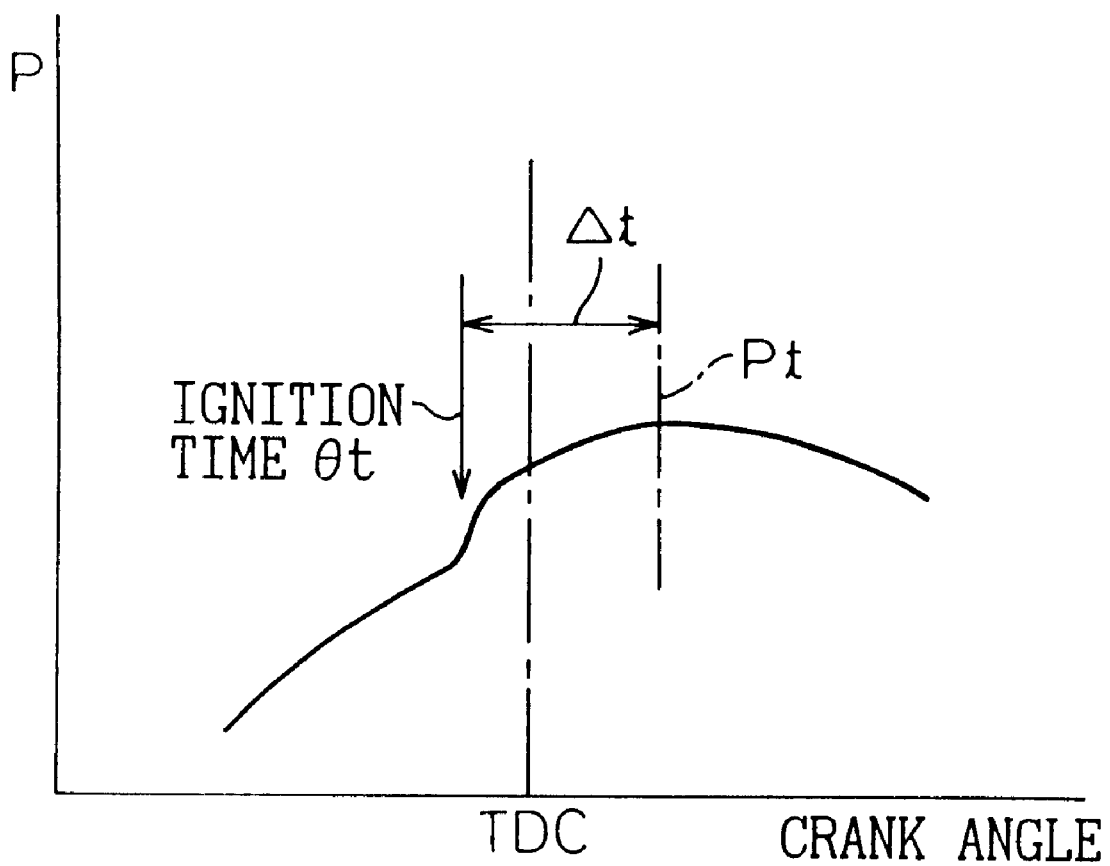
FIG. 12 is a view of changes in pressure in the combustion chamber.

FIG. 12 shows changes in the pressure P in the combustion chamber 4 when spark-assisted self-ignition combustion is performed. As shown in FIG. 12, if a spark is generated at the time θt when self-ignition combustion is performed, the pressure P rises relatively gently and peaks at the time Pt after top dead center TDC of the compression stroke after the elapse of the time Δt after spark generation. If the gas temperature TE in the combustion chamber 4 at the time of spark generation becomes lower than the target temperature TEO, which is an intermediate value between the lower limit temperatures T1 and T2 shown in FIG. 3, the amount of heat of the gas in the combustion chamber 4 becomes lower, so the elapsed time Δt becomes longer. If the gas temperature TE in the combustion chamber 4 at the time of spark generation becomes higher than the target temperature TEO, the amount of heat of the gas in the combustion chamber 4 becomes higher, so the elapsed time Δt becomes shorter.

Therefore, in this embodiment, when the elapsed time Δt becomes longer than a predetermined upper limit $t_{max}$, the opening timing of the intake valve 5 is advanced and the gas temperature TE in the combustion chamber 4 at the time of spark generation is raised. When the elapsed time Δt becomes lower than a predetermined lower limit $t_{min}$, the opening timing of the intake valve 5 is retarded and the gas temperature TE in the combustion chamber 4 at the time of spark generation is made lower, whereby the combustion is controlled for continuation of the self-ignition combustion.

Figure 13:
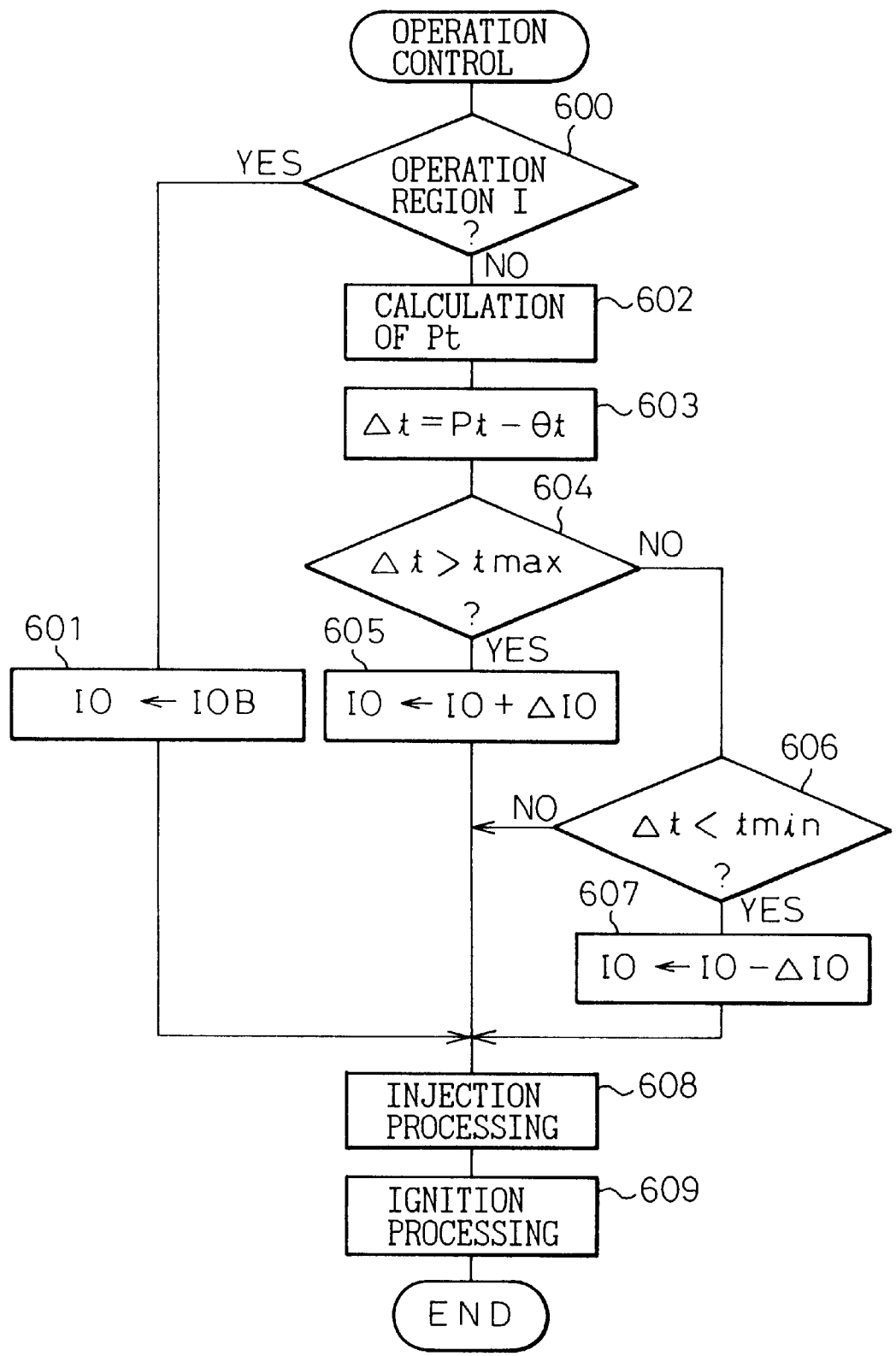
FIG. 13 is a flow chart of the control of the operation in a sixth embodiment.

FIG. 13 shows the routine for the control of the operation for working a sixth embodiment.

Referring to FIG. 13, first, at step 600, it is judged if the engine is operating in the operation region I shown in FIG. 4 or not. When in the operation region I, the routine proceeds to step 601, where the opening timing IO of the intake valve 5 is made an opening timing IOB determined in advance based on the operating state of the engine. Next, at step 608, processing is performed for fuel injection, then at step 609, processing is performed for spark generation at the optimum spark timing. At this time, the conventionally performed normal combustion is performed.

On the other hand, when it is judged at step 600 that the engine is operating in the medium load operation region II or high load operation region III shown in FIG. 4, the routine proceeds to step 602, where the time Pt where the pressure in the combustion chamber 4 peaks is calculated. Next, at step 603, the time Pt is reduced by the time θt where a spark is generated to calculate the elapsed time Δt. Next, at step 604, it is judged if the elapsed time Δt is larger than the upper limit $t_{max}$ or not.

When $\Delta t > t_{max}$, the routine proceeds to step 605, where the opening timing IO of the intake valve 5 is advanced by $\Delta$IO and therefore the gas temperature TE in the combustion chamber 4 at the time of spark generation is raised. As opposed to this, when $\Delta t \leq t_{max}$, the routine proceeds to step 606, where it is judged if the elapsed time $\Delta t$ is smaller than the lower limit $t_{min}$. When $\Delta t < t_{min}$, the routine proceeds to step 607, where the opening timing IO of the intake valve 5 is retarded by $\Delta$IO and therefore the gas temperature TE in the combustion chamber 4 at the time of spark generation is reduced. The self-ignition combustion is continued in this way.

Note that when the conventionally performed normal combustion is performed in the high load operation region III, it is sufficient to proceed to step 601 when the engine is operating in the operation region I or III at step 600.

Next, an explanation will be given of a seventh embodiment. In the seventh embodiment, it is judged if the gas temperature TE in the combustion chamber 4 at the time of spark generation is between the lower limit temperatures T1 and T2 shown by the hatching in FIG. 3 based on the strength of the knocking detected by the knocking sensor 40.

Figure 14A:
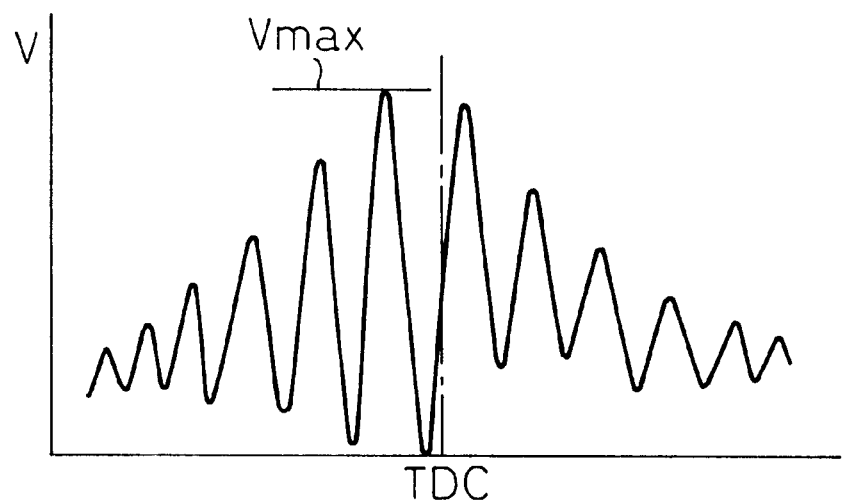
FIGS. 14A and 14B are views of the output voltage of a knocking sensor and the method of control of the opening timing of the intake value based on the output voltage.
Figure 14B:
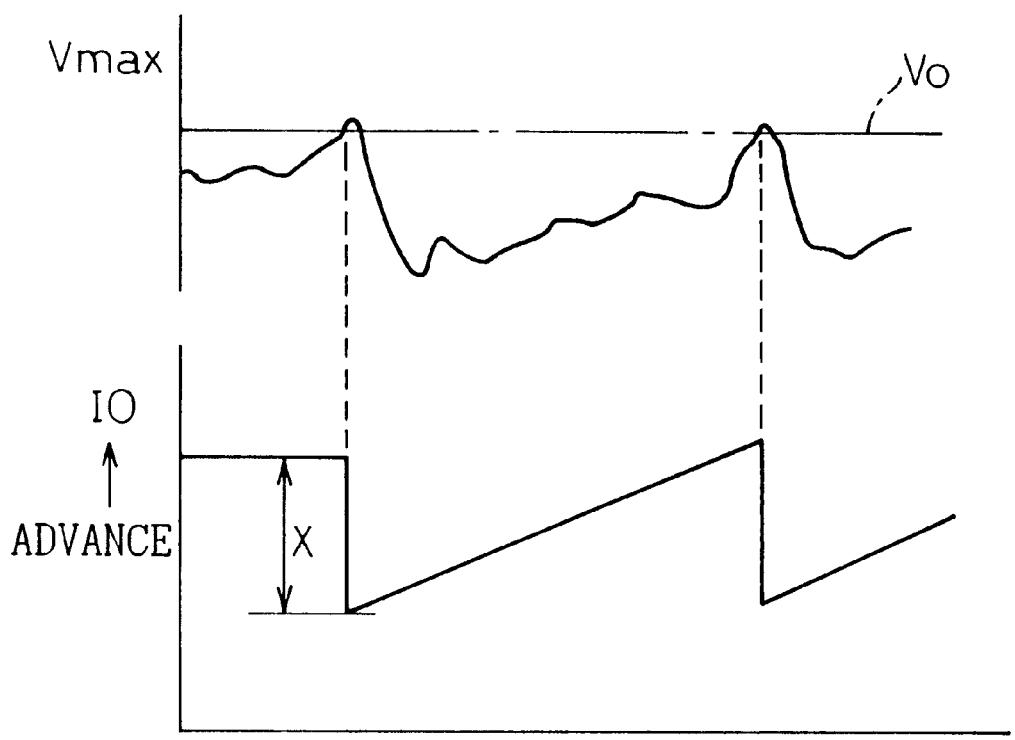

That is, if the gas temperature in the combustion chamber 4 exceeds the lower limit temperature T1, rapid combustion occurs at the top dead center of the compression stroke and knocking occurs. FIG. 14A shows the changes in the output voltage V of the knocking sensor 4 at this time. In this embodiment, the maximum value $V_{max}$ of the output voltage V of the knocking sensor 40 (FIG. 14A) is detected and the opening timing IO of the intake valve 5 is rapidly retarded by a certain value X when the maximum value $V_{max}$ exceeds a predetermined reference value $V_0$ as shown in FIG. 14B. As a result, the gas temperature in the combustion chamber 4 falls. Next, the opening timing IO of the intake valve 5 is gradually advanced.

In this way, the engine is controlled so that the temperature in the combustion chamber 4 does not exceed the lower limit temperature T1. Note that the value of the certain value X is determined so that even if the opening timing IO of the intake valve 5 is retarded by the certain value X, the temperature in the combustion chamber 4 at that time will not become lower than the lower limit temperature T2, so in the end, in this embodiment as well, the gas temperature in the combustion chamber 4 is controlled to between the lower limit temperatures T1 and T2 shown by the hatching in FIG. 3.

FIG. 15 shows the routine for the control of the operation for working in a seventh embodiment.

Referring to FIG. 15, first, at step 700, it is judged if the engine is operating in the operation region I shown in FIG. 4 or not. When in the operation region I, the routine proceeds to step 701, where the opening timing IO of the intake valve 5 is made an opening timing IOB determined in advance based on the operating state of the engine. Next, at step 706, processing is performed for fuel injection, then at step 708, processing is performed for spark generation at the optimum spark timing. At this time, the conventionally performed normal combustion is performed.

On the other hand, when it is judged at step 700 that the engine is operating in the medium load operation region II or high load operation region III shown in FIG. 4, the routine proceeds to step 702, where the intermediate value of the lower limit temperatures T1 and T2 shown in FIG. 3 is made the target temperature TEO. Next, at step 702, the maximum value $V_{max}$ of the output voltage V of the knocking sensor 40 is calculated. Next, at step 703, it is judged if $V_{max}$ is larger than the reference voltage $V_0$. When $V_{max} > V_0$, the routine proceeds to step 704, where the opening timing IO of the intake valve 5 is retarded stepwise by the certain value X (FIG. 14B) whereby TE is reduced. On the other hand, when $V_{max} \leq V_0$, the routine proceeds to step 705 where the opening timing IO of the intake valve 5 is advanced by $\Delta$IO ($\Delta$IO <X), whereby TE is gradually raised. In this way, the gas temperature TE in the combustion chamber 4 at the time of spark generation is maintained between the lower limit temperature T1 and T2, therefore spark-assisted self-ignition combustion is performed at this time.

Note that when the conventionally performed normal combustion is performed in the high load operation region III, it is sufficient to proceed to step 701 when the engine is operating in the operation region I or III at step 700.

Next, an explanation will be given of an eighth embodiment. In the eighth embodiment, the opening timing of the intake valve 5 is controlled to control the gas temperature TE in the combustion chamber 4 at the time of spark generation to the target temperature TEO. In this case, if the temperature TE in the combustion chamber 4 at the time of spark generation becomes lower than the lower limit temperature T2, the spark timing is delayed so that the spark is generated after the temperature in the combustion chamber 4 exceeds the lower limit temperature T2.

Figure 16A:
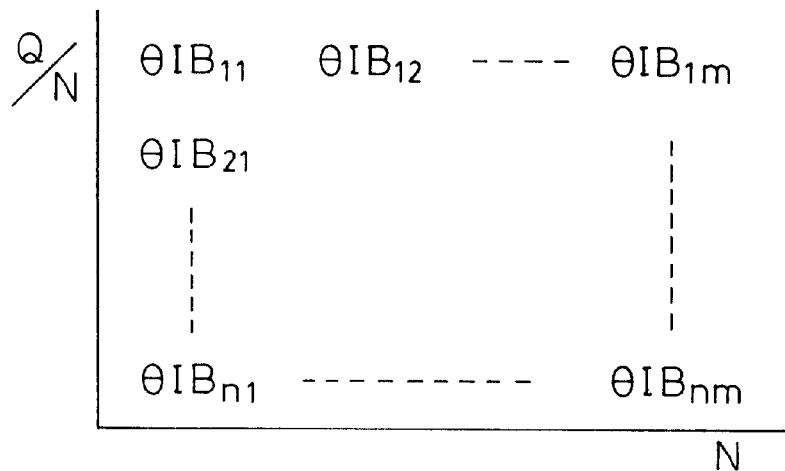
FIGS. 16A and 16B are views of the spark timing.
Figure 16B:
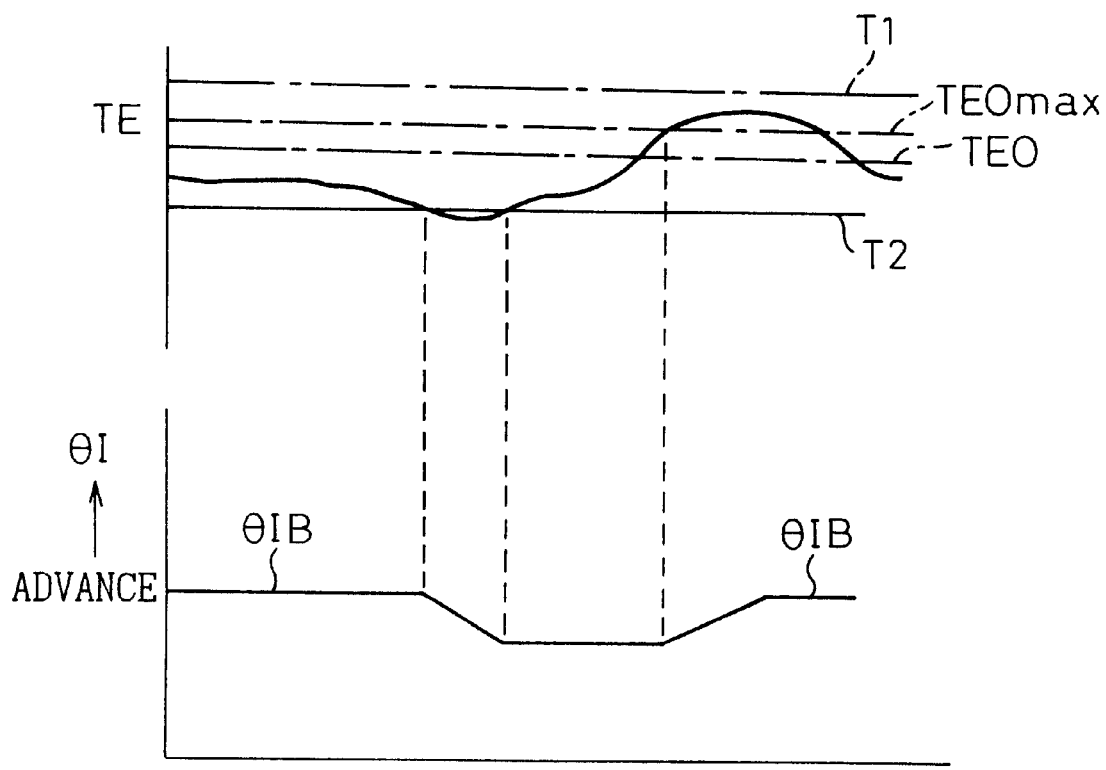

That is, in this embodiment of the present invention, as shown by FIG. 16A, the optimum spark timing $\theta$IB is stored in advance in the ROM in the form of a map as a function of the engine load Q/N and the engine rotational speed N. Normally, the spark timing is made this optimum spark timing. There are cases, however, when no matter how much the opening timing of the intake valve 5 is advanced, the gas temperature TE in the combustion chamber 4 will not reach the lower limit temperature T2 at the optimum spark timing $\theta$IB. In such a case, in the eighth embodiment, as shown in FIG. 16B, the spark timing $\theta$I is gradually retarded so that the spark is generated after the gas temperature TE in the combustion chamber 4 exceeds the lower limit temperature T2.

Figure 17:
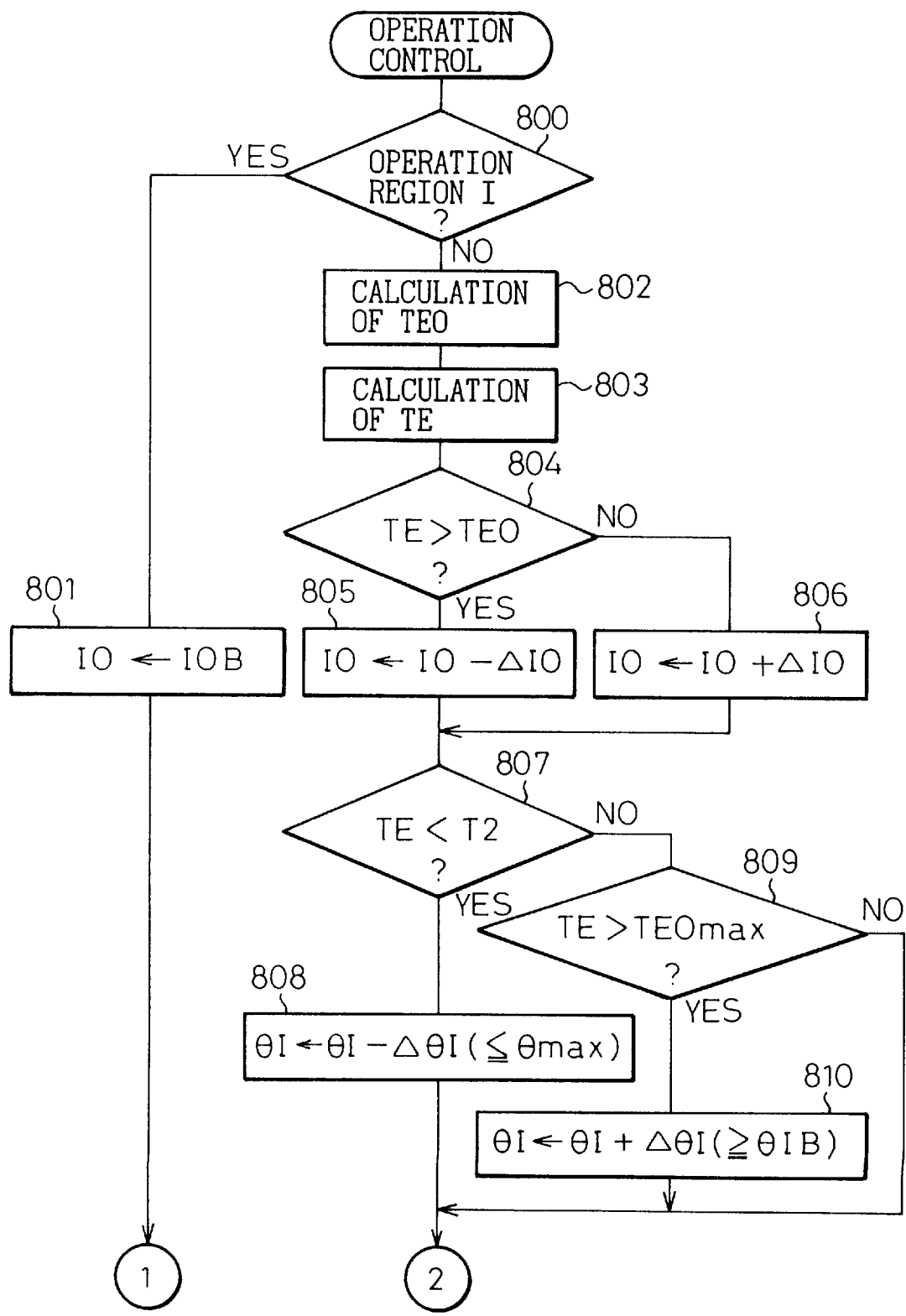

FIGS. 17 and 18 show the routine for control of the operation for working an eighth embodiment.

Referring to FIG. 17 and FIG. 18, first, at step 800, it is judged if the engine is operating in the operation region I shown in FIG. 4 or not. When in the operation region I, the routine proceeds to step 801, where the opening timing IO of the intake valve 5 is made an opening timing IOB determined in advance based on the operating state of the engine. Next, at step 811, processing is performed for fuel injection, then at step 812, processing is performed for spark generation at the optimum spark timing $\theta$IB. At this time, the conventionally performed normal combustion is performed.

On the other hand, when it is judged at step 800 that the engine is operating in the medium load operation region II or high load operation region III shown in FIG. 4, the routine proceeds to step 802, where the intermediate value of the lower limit temperatures T1 and T2 shown in FIG. 3 is made the target temperature TEO. Next, at step 803, the TE calculated based on FIG. 6A from the output signal of the temperature sensor 41 is multiplied with the correction coefficient K shown in FIG. 6B to calculate the final TE. Next, at step 804, it is judged if TE is larger than TEO or not. When TE>TEO, the routine proceeds to step 805, where the opening timing IO of the intake valve 5 is retarded by $\Delta$IO and therefore TE is reduced. On the other hand, when TE $\leq$ TEO, the routine proceeds to step 806, where the opening timing IO of the intake valve 5 is advanced by $\Delta$IO and therefore TE is raised. In this way, the gas temperature TE in the combustion chamber 4 at the time of spark generation is made the target temperature.

Next, at step 807, it is judged if TE is lower than the lower limit temperature T2 or not. When TE<T2, the routine proceeds to step 808, where the spark timing θI is retarded by the predetermined value ΔθI. Therefore, so long as TE<T2, the spark timing θI is gradually retarded. If the spark timing θI reaches the predetermined maximum delay timing $\theta_{max}$, the spark timing θI is maintained at the maximum delay timing $\theta_{max}$.

On the other hand, if it is judged at step 807 that TE≧T2, the routine proceeds to step 809, where it is judged if TE has become larger than the predetermined upper limit $TEO_{max}$ (FIG. 16B). When TE>$TEO_{max}$, the routine proceeds to step 810, where the spark timing θI is gradually advanced by ΔθI at a time until returning to the optimum spark timing θIB.

Next, an explanation will be given of a ninth embodiment. In this embodiment, NOx is made to be released from the NOx absorbent 26 when spark-assisted self-ignition combustion is being performed.

The NOx absorbent is comprised of a carrier made of for example alumina on which are carried at least one element selected from potassium K, sodium Na, lithium Li, cesium Cs, and other alkali metals, and barium Ba, calcium Ca, and other alkali earths, lanthanum La, yttrium Y, and other rare earths and a precious metal such as platinum Pt. The NOx absorbent 26 absorbs NOx when the air-fuel ratio of the exhaust gas flowing into the NOx absorbent 26 is lean and releases and reduces the absorbed NOx when the air-fuel ratio of the exhaust gas flowing into the NOx absorbent 26 becomes rich or the stoichiometric air-fuel ratio.

As explained above, in the internal combustion engine according to the present invention, it is possible to realize spark-assisted self-ignition combustion regardless of the air-fuel ratio in the combustion chamber 4, therefore if a lean air-fuel ratio is normally mainly used in this embodiment, the air-fuel ratio is made the stoichiometric air-fuel ratio or rich when NOx is to be released from the NOx absorbent 26.

Note that there are limits to the absorbing capability of the NOx absorbent 26. It is necessary to release the NOx from the NOx absorbent 26 before the NOx absorbing capability of the NOx absorbent 26 becomes saturated. Therefore, in this embodiment, the amount of the NOx absorbed by the NOx absorbent 26 is estimated and the NOx is made to be released from the NOx absorbent 26 when the amount of NOx absorbed exceeds the allowable limit.

Figure 19A:
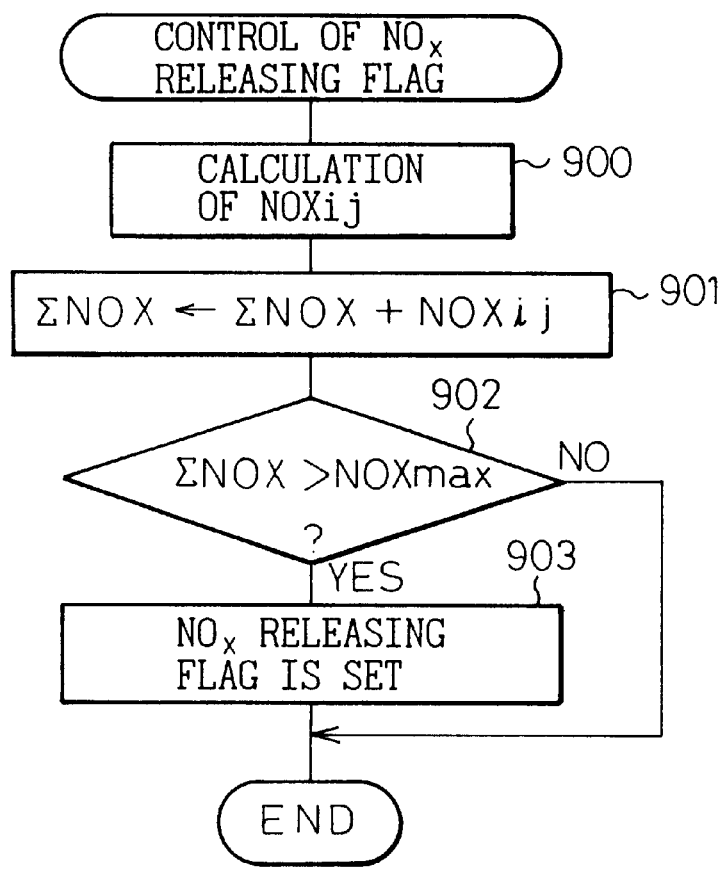
FIGS. 19A and 19B are views of a flow chart for control of an NOx releasing flag.

FIG. 19A shows a routine for control of an NOx releasing flag showing that NOx is to be released from the NOx absorbent 26. This routine is executed by interruption every predetermined interval.

Figure 19B:
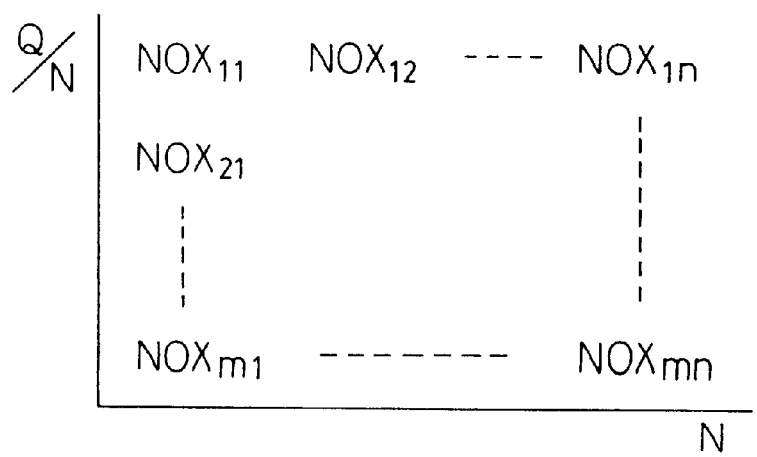

Referring to FIG. 19A, first, at step 900, the amount $NOx_{ij}$ of NOx absorbed in the NOx absorbent 26 per unit time is calculated when the engine is operating using a lean air-fuel ratio. The amount $NOx_{ij}$ of NOx is found in advance by experiments and is stored in advance in the ROM 32 in the form of a map shown in FIG. 19B as a function of the engine load Q/N and engine rotational speed N. Next, at step 901, $NOx_{ij}$ is added to ΣNOx to calculate the amount ΣNOx of NOx absorbed in the NOx absorbent 26. Next, at step 902, it is judged if this ΣNOx has exceeded the allowable limit $NOx_{max}$. When ΣNO>$NOx_{max}$, the routine proceeds to step 903, where the NOx releasing flag is set.

Figure 20:
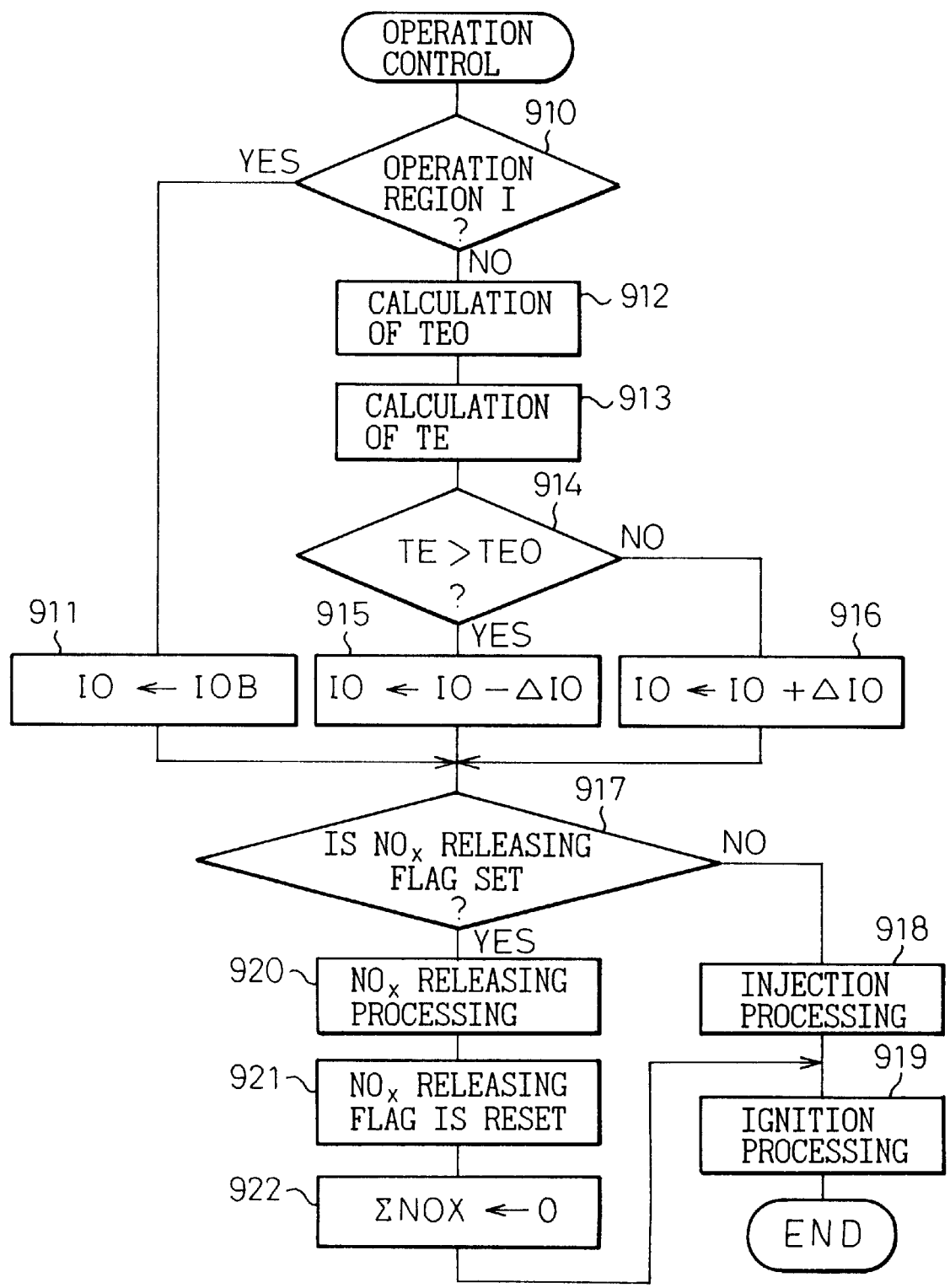
FIG. 20 is a flow chart of the control of the operation in a ninth embodiment.

FIG. 20 shows the routine for control of the operation for working a ninth embodiment.

Referring to FIG. 20, first, at step 910, it is judged if the engine is operating in the operation region I shown in FIG. 4 or not. When in the operation region I, the routine proceeds to step 911, where the opening timing IO of the intake valve 5 is made an opening timing IOB determined in advance based on the operating state of the engine. Next, at step 917, it is judged if the NOx releasing flag has been set or not. When the NOx releasing flag has not been set, the routine proceeds to step 918, wherein processing is performed for fuel injection, then at step 919, processing is performed for spark generation at the optimum spark timing. At this time, the conventionally performed normal combustion is performed.

On the other hand, when it is judged at step 910 that the engine is operating in the medium load operation region II or high load operation region III shown in FIG. 4, the routine proceeds to step 912, where the intermediate value of the lower limit temperatures T1 and T2 shown in FIG. 3 is made the target temperature TEO. Next, at step 913, the TE calculated based on FIG. 6A from the output signal of the temperature sensor 41 is multiplied with the correction coefficient K shown in FIG. 6B to calculate the final TE. Next, at step 914, it is judged if TE is larger than TEO or not. When TE >TEO, the routine proceeds to step 915, where the opening timing IO of the intake valve 5 is retarded by ΔIO and therefore TE is reduced. On the other hand, when TE ≦TEO, the routine proceeds to step 916, where the opening timing IO of the intake valve 5 is advanced by ΔIO and therefore TE is raised. In this way, the gas temperature TE in the combustion chamber 4 at the time of spark generation is made the target temperature, therefore at this time spark-assisted self-ignition combustion is performed.

On the other hand, when it is judged at step 917 that the NOx releasing flag is set, the routine proceeds to step 920, where the air-fuel ratio is for example made rich for exactly a certain time. Due to this, NOx is released from the NOx absorbent 26. Next, at step 921, the NOx releasing flag is reset, then at step 922, the amount ΣNOx of the NOx is made zero.

Note that when the conventionally performed normal combustion is performed in the high load operation region III, it is sufficient to proceed to step 911 when the engine is operating in the operation region I or III at step 910.

In this way, according to the present invention, the gas temperature in the combustion chamber 4 is controlled by controlling the amount of the EGR gas or the opening timing of the intake valve 5, or by other various control methods. In this case, to facilitate the spark-assisted self-ignition combustion, it is possible to made dual use of an auxiliary control method in addition to the above control method. One of these is the method of controlling the cooling action of the engine. For example, the temperature of the engine cooling water can be controlled so that when the gas temperature in the combustion chamber 4 at the time of spark generation does not rise to the lower limit temperature T2, the temperature of the engine cooling water is raised to make the gas temperature in the combustion chamber 4 exceed the lower limit temperature T2 and so that when the gas temperature in the combustion chamber 4 at the time of spark generation ends up exceeding the lower limit temperature T1, the temperature of the engine cooling water is lowered to make the gas temperature in the combustion chamber 4 fall below the lower limit temperature T1. By controlling the temperature of the cooling water in this way, it is possible to control the valve opening temperature of the thermostat for control of the circulation of cooling water from the engine block to the radiator.

Figure 21A:
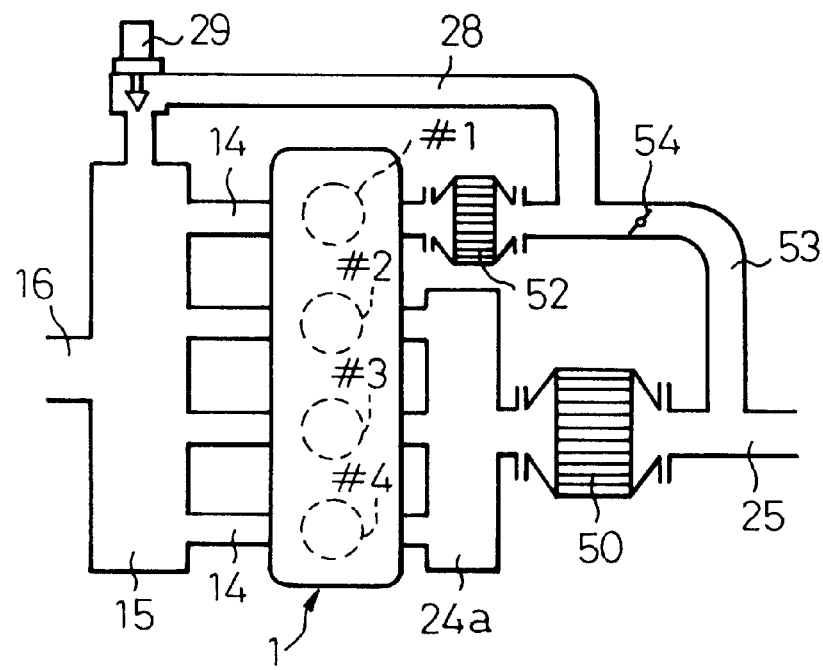
FIGS. 21A and 21B are views of a still further embodiment of an internal combustion engine.

Further, as an auxiliary control method, it is possible to use an internal combustion engine shown in FIG. 21A. In this internal combustion engine, as shown in FIG. 21A, the no. 2 cylinder #2 to no. 4 cylinder #4 are connected to a common exhaust manifold 24a. The exhaust manifold 24a is for example connected through the threeway catalyst 50 to the exhaust pipe 25. On the other hand, the no. 1 cylinder #1 is connected through the three-way catalyst 52 and exhaust pipe 53 to the exhaust pipe 25. In the exhaust pipe 53 is arranged an exhaust control valve 54. An EGR passage 28 is opened in the exhaust pipe 53 between the three-way catalyst 52 and exhaust control valve 54. In this case, it is possible to arrange a cooling device in the EGR passage 28.

Figure 21B:
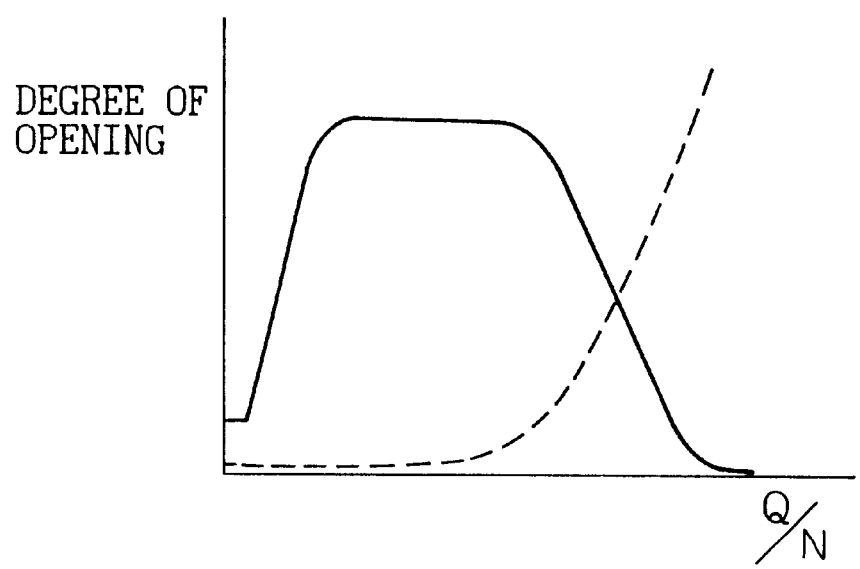

The solid line in FIG. 21B shows the degree of opening of the EGR control valve 29, while the broken line shows the degree of opening of the exhaust control valve 54. Further, in FIG. 21B, the abscissa Q/N shows the engine load. In this embodiment, at the time of engine low load operation and engine medium load operation, that is, when the EGR control valve 29 opens and the exhaust control valve 54 closes, a rich air-fuel mixture is burned at the no. 1 cylinder #1 and a stoichiometric air-fuel ratio air-fuel mixture or lean air-fuel mixture is burned at the no. 2 cylinder #2 to no. 4 cylinder #4.

When a rich air-fuel mixture is burned, several percent of hydrogen $H_2$ is produced at the three-way catalyst 52. The EGR gas including this hydrogen $H_2$ is recirculated to the inside of the surge tank 15. As a result, EGR gas including hydrogen $H_2$ and intake air are supplied to the cylinders. If hydrogen $H_2$ is included in the gas in the combustion chamber 4, ignition by the spark plug 12 (FIG. 1) becomes easy. Further, spark-assisted self-ignition combustion becomes easier as well. That is, in this embodiment, it is possible to secure stable self-ignition combustion.

Figure 22A:
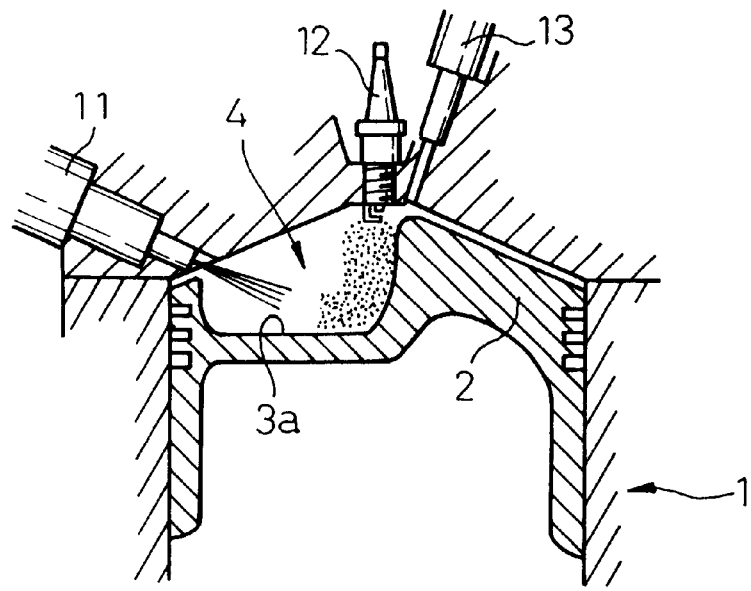
FIGS. 22A and 22B are views of a still further embodiment of an internal combustion engine.

FIG. 22A shows an internal combustion engine having a combustion chamber of a different shape. In this internal combustion engine, a fuel injector 11 is arranged at the periphery of the top surface of the combustion chamber 4, while the spark plug 12 is arranged at the center of the top surface of the combustion chamber 4. Further, a cavity 3a extending from below the fuel injector 11 to below the spark plug 12 is formed in the top surface of the piston 2.

Figure 22B:
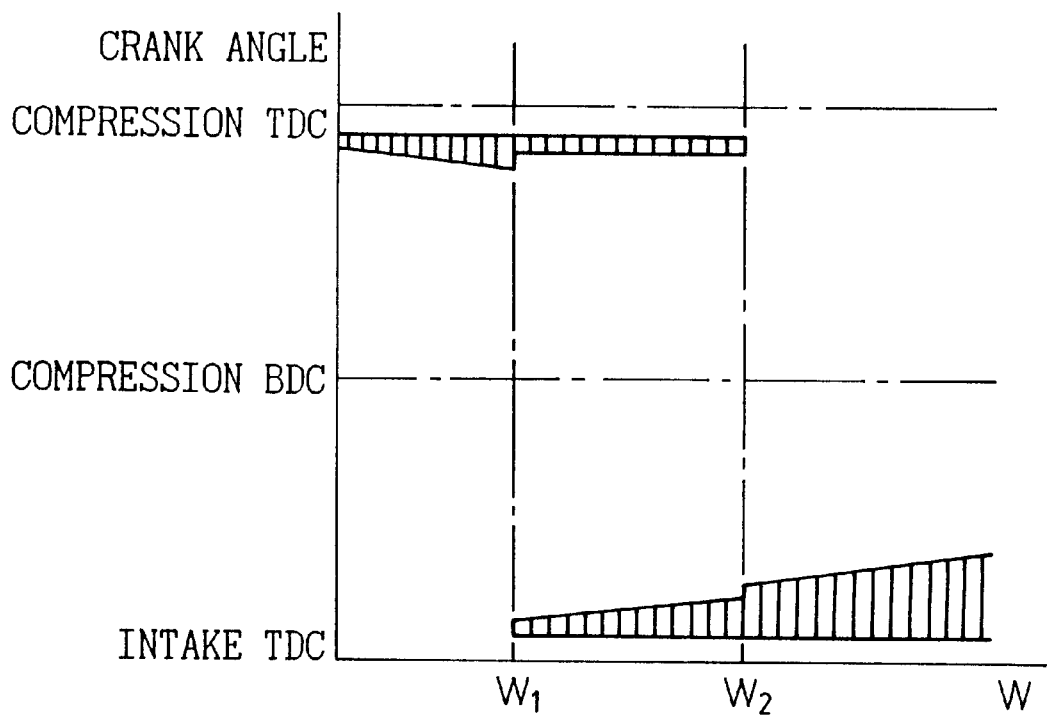

FIG. 22B shows the injection time at a certain engine rotational speed. Note that in FIG. 22B, the abscissa W shows the amount of injection. As will be understood from FIG. 22A and FIG. 22B, in this internal combustion engine, at the time of engine low load operation where the amount of injection W is less than $W_1$, the fuel is injected toward the cavity 3a at the end of the compression stroke. This injected fuel is guided by the inner wall surface of the cavity 3a and collects around the spark plug 12. That is, stratified combustion is performed at the time of engine low load operation.

On the other hand, at the time of medium load operation where the amount of injection W is between $W_1$ and $W_2$, first, fuel is injected toward the inside of the cavity 3a at the start of the suction stroke. Due to this, a lean uniform air-fuel mixture is formed. Next, fuel is injected toward the inside of the cavity 3a again at the end of the compression stroke. The flame of ignition of this fuel serves as an ignition source, and thus the lean uniform air-fuel mixture is burned. Further, at the time of engine high load operation where the amount of injection W is greater than $W_2$, fuel is injected toward the cavity 3a at the start of the suction stroke. Due to this, a uniform air-fuel mixture is formed in the combustion chamber 4.

In the internal combustion engine shown in FIG. 22A, even at the time of stratified combustion, spark-assisted self-ignition combustion is performed if the gas temperature TE in the combustion chamber 4 at the time of spark generation is between the lower limit temperatures T1 and T2 shown by the hatching in FIG. 3. Therefore, in this internal combustion engine as well, it is possible to apply all of the routines for control of the operation explained above.

In the internal combustion engine shown in FIG. 1 as well, the fuel is injected in the cavity 3. In the internal combustion engine shown in FIG. 22A too, fuel is injected in the cavity 3a. In this way, if the fuel is injected into the cavities 3 and 3a, the majority of the fuel stops in the cavities 3 and 3a, therefore it is possible to suppress entry of fuel between the outer circumferential surface of the piston 3 and the inner wall surface of the cylinder bore, so it is possible to suppress generation of unburned hydrocarbons.

Further, it is possible to arrange a plurality of spark plugs in the combustion chamber 4. As explained above, when a spark is generated, the pressure around the spark plugs rise, whereby the pressure of the combustion chamber 4 as a whole rises. As a result, the gas temperature of the entire inside of the combustion chamber 4 rises, so reaches self-ignition combustion. In this case, by providing a plurality of spark plugs, the rise in pressure in the combustion chamber 4 as a whole at the time of spark generation becomes greater. As a result, the rise in gas temperature inside the combustion chamber 4 as a whole also becomes greater, therefore it is possible to more reliably achieve self-ignition combustion.

Further, the explanation up to here was made with reference to various routines for control of the operation, but it is possible to combine any of these routines for control of operation. For example, by simultaneously controlling the degree of opening of the EGR control valve 29 and the opening timing and supercharging pressure of the intake valve 5, it is possible to control the gas temperature TE in the combustion chamber 4 at the time of spark generation to between the lower limit temperatures T1 and T2 shown by the hatching in FIG. 3. In this case, it is possible to simultaneously control the gas temperature in the combustion chamber 4 based on the output signal of the knocking sensor 40 in addition to control of the gas temperature in the combustion chamber 4 based on the output signal of the temperature sensor 41.

Note that the present invention was explained up to here with reference to the case of application to a four-stroke engine, but needless to say the present invention can also be applied to a two-stroke engine.

While the invention has been described by reference to specific embodiments chosen for purposes of illustration, it should be apparent that numerous modifications could be made thereto by those skilled in the art without departing from the basic concept and scope of the invention.

What is claimed is:

1. A spark-assist type self-ignition engine comprising:
   a combustion chamber;
   a spark plug arranged in the combustion chamber;
   judging means for judging if a gas temperature in the combustion chamber at the end of a compression stroke is a target temperature or within a target temperature range at which substantially simultaneous ignition of an entire air-fuel mixture is caused when a spark is generated; and
   control means for controlling the gas temperature in the combustion chamber at the end of the compression stroke to the target temperature range based on the results of judgement of the judging means.

2. A spark-assist type self-ignition engine as set forth in claim 1, wherein the target temperature or the target temperature range is a function of the pressure.

3. A spark-assist type self-ignition engine as set forth in claim 1, wherein detecting means is provided for detecting the gas temperature in the combustion chamber and wherein said judging means judges if the gas temperature in the combustion chamber at the end of the compression stroke is the target temperature or within the target temperature range from the gas temperature detected by the detecting means.

4. A spark-assist type self-ignition engine as set forth in claim 1, wherein detecting means is provided for detecting a time until a pressure inside the combustion chamber after the generation of a spark peaks, said judging means judges if the gas temperature in the combustion chamber at the end of the compression stroke is the target temperature or within the target temperature range from said time, and the control means controls said time so that it becomes a predetermined time so as to control the gas temperature in the combustion chamber at the end of the compression stroke to the target temperature or within the target temperature range.

5. A spark-assist type self-ignition engine as set forth in claim 1, wherein a knocking sensor is provided for detecting knocking, said judging means judges if the gas temperature in the combustion chamber at the end of the compression stroke is the target temperature or within the target temperature range from an output signal of the knocking sensor, and the control means controls the strength of the knocking to a predetermined range so as to control the gas temperature in the combustion chamber at the end of the compression stroke to the target temperature or within the target temperature range.

6. A spark-assist type self-ignition engine as set forth in claim 1, wherein an exhaust gas recirculation device is provided for recirculating exhaust gas in an engine intake passage and wherein said control means controls one of the amount and temperature of the recirculated exhaust gas to control the gas temperature in the combustion chamber at the end of the compression stroke to the target temperature or within the target temperature range.

7. A spark-assist type self-ignition engine as set forth in claim 1, wherein means for controlling an opening timing of an intake valve is provided and wherein said control means controls the opening timing of the intake valve so as to control the gas temperature in the combustion chamber at the end of the compression stroke to the target temperature or within the target temperature range.

8. A spark-assist type self-ignition engine as set forth in claim 1, wherein means for controlling a compression ratio of the engine is provided and wherein said control means controls said compression ratio so as to control the gas temperature in the combustion chamber at the end of the compression stroke to the target temperature or within the target temperature range.

9. A spark-assist type self-ignition engine as set forth in claim 1, wherein means for controlling a supercharging pressure of intake air supplied to the engine is provided and wherein said control means controls said supercharging pressure so as to control the gas temperature in the combustion chamber at the end of the compression stroke to the target temperature or within the target temperature range.

10. A spark-assist type self-ignition engine as set forth in claim 1, wherein means for controlling an opening timing of an exhaust valve is provided and wherein said control means controls the opening timing of the exhaust valve so as to control the gas temperature in the combustion chamber at the end of the compression stroke to the target temperature or within the target temperature range.

11. A spark-assist type self-ignition engine as set forth in claim 1, wherein spark timing control means is provided for controlling a spark timing so that a spark is generated when the gas temperature in the combustion chamber at the end of the compression stroke is the target temperature or within the target temperature range.

12. A spark-assist type self-ignition engine as set forth in claim 1, wherein the control of the gas temperature in the combustion chamber by the control means is assisted by the provision of auxiliary control means in addition to the control means.

13. A spark-assist type self-ignition engine as set forth in claim 12, wherein the auxiliary control means is comprised of means for making an air-fuel ratio of at least one cylinder rich, a catalyst arranged in an exhaust passage of a cylinder with a rich air-fuel ratio, and means for supplying exhaust gas passing through the catalyst to at least one remaining cylinder.

14. A spark-assist type self-ignition engine as set forth in claim 12, wherein said auxiliary control means is comprised of cooling control means for controlling the cooling action of the engine.

15. A spark-assist type self-ignition engine as set forth in claim 1, wherein a plurality of spark plugs are provided.

16. A spark-assist type self-ignition engine as set forth in claim 1, wherein injecting means for injecting additional fuel after substantially simultaneous ignition of the entire air-fuel mixture by a spark is provided.

17. A spark-assist type self-ignition engine as set forth in claim 1, wherein a piston is provided, a cavity is formed in a top surface of the piston, and fuel is injected in the cavity.

18. A spark-assist type self-ignition engine as set forth in claim 1, wherein an NOx absorbent is arranged in an engine exhaust passage, said NOx absorbent absorbs NOx when an air-fuel ratio of exhaust gas flowing into it is lean, and releases the absorbed NOx when the air-fuel ratio in the combustion chamber is made the stoichiometric air-fuel ratio or rich when the NOx is to be released from the NOx absorbent, and at this time, substantially simultaneous ignition of the entire air-fuel mixture by a spark is provided.

19. A spark-assist type self-ignition engine as set forth in claim 1, wherein an air-fuel mixture is formed concentratedly around the spark plug when an engine load is lower than a predetermined load.

* * * * *